United States Patent
Hosseini et al.

(10) Patent No.: US 11,102,816 B2
(45) Date of Patent: Aug. 24, 2021

(54) COLLISION AVOIDANCE FOR TRANSMISSIONS IN COINCIDING TRANSMISSION TIME INTERVALS

(71) Applicant: QUALCOMM Incorporated, San Diego, CA (US)

(72) Inventors: Seyedkianoush Hosseini, San Diego, CA (US); Wanshi Chen, San Diego, CA (US); Amir Farajidana, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/275,176

(22) Filed: Feb. 13, 2019

(65) Prior Publication Data
US 2019/0261415 A1    Aug. 22, 2019

Related U.S. Application Data

(60) Provisional application No. 62/631,602, filed on Feb. 16, 2018.

(51) Int. Cl.
*H04W 74/08*    (2009.01)
*H04L 1/18*    (2006.01)
(Continued)

(52) U.S. Cl.
CPC .......... *H04W 74/0816* (2013.01); *H04L 1/08* (2013.01); *H04L 1/1812* (2013.01);
(Continued)

(58) Field of Classification Search
CPC ......... H04W 74/0816; H04W 72/1268; H04W 72/1242; H04W 72/1284; H04W 72/0446; H04L 1/08; H04L 1/1812
See application file for complete search history.

(56) References Cited

U.S. PATENT DOCUMENTS

2018/0205534 A1*    7/2018    Yi .............................. H04J 3/02
2019/0132837 A1*    5/2019    Yi ..................... H04W 72/0446

FOREIGN PATENT DOCUMENTS

EP    2184883 A2    5/2010
EP    3244682 A1    11/2017

OTHER PUBLICATIONS

Huawei et al., "WF on handling Collisions of TTI/sTTI in UL", 3GPP Draft; R1-1709478, 3rd Generation Partnership Project (3GPP), Mobile Competence Centre; 650, Route Des Lucioles; F-06921 Sophia-Antipolis Cedex; France, vol. RAN WG1, No. Hangzhou, China; May 15-19, 2017 May 17, 2017, XP051285156, Retrieved from the Internet: URL:http://www.3gpp.org/ftp/tsg_ran/WG1_RL1/TSGR1_89/Docs/ [retrieved on May 17, 2017], 9 pages.

(Continued)

*Primary Examiner* — Jae Y Lee
(74) *Attorney, Agent, or Firm* — QUALCOMM Incorporated

(57) ABSTRACT

Methods, systems, and devices for wireless communications are described. In some wireless communications systems, a base station may configure a user equipment (UE) to transmit a first message in a set of transmission time intervals (TTIs) of a repetition window, and the base station may configure the same UE or a different UE to transmit a second message in a shortened TTI (sTTI). In such systems, if the base station schedules the transmission of the second message in an sTTI that coincides with at least one overlapping TTI in the set of TTIs of the repetition window, the UE may drop at least a portion of the transmission of the first message in the set of TTIs. Alternatively, the base station may avoid scheduling the uplink transmission of the second message in an sTTI that coincides with a TTI in the set of TTIs of the repetition window.

30 Claims, 12 Drawing Sheets

(51) Int. Cl.
*H04W 72/04* (2009.01)
*H04W 72/12* (2009.01)
*H04L 1/08* (2006.01)

(52) U.S. Cl.
CPC ... *H04W 72/0446* (2013.01); *H04W 72/1242* (2013.01); *H04W 72/1268* (2013.01); *H04W 72/1284* (2013.01)

(56) References Cited

OTHER PUBLICATIONS

International Search Report and Written Opinion—PCT/US2019/017970—ISA/EPO—dated Apr. 17, 2019.

\* cited by examiner

COLLISION AVOIDANCE FOR TRANSMISSIONS IN COINCIDING TRANSMISSION TIME INTERVALS

CROSS REFERENCES

The present Application for Patent claims the benefit of U.S. Provisional Patent Application No. 62/631,602 by HOSSEINI, et al., entitled "Collision Avoidance For Transmissions In Coinciding Transmission Time Intervals," filed Feb. 16, 2018, assigned to the assignee hereof, and expressly incorporated herein.

BACKGROUND

The following relates generally to wireless communication and more specifically to collision avoidance for transmissions in coinciding transmission time intervals (TTIs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some wireless communications systems, a base station may configure a UE to transmit uplink signals in a set of TTIs of a repetition window to improve the chances that the base station receives the uplink signals. The UE or another UE may also have shortened TTIs (sTTIs) allocated to it for transmissions of other uplink signals. In such systems, it may be challenging for the UE to avoid collisions between transmissions in the set of TTIs and transmissions in sTTIs.

SUMMARY

In some wireless communications systems, a base station may configure a user equipment (UE) to transmit a first message in a set of transmission time intervals (TTIs) of a repetition window to improve the chances that the first message is received by the base station, and the base station may configure the same UE or a different UE to transmit a second message in a shortened TTI (sTTI). In such systems, a UE or base station may use the techniques described herein to avoid collisions between uplink transmissions in the set of TTIs and uplink transmissions in the sTTI. For instance, if the base station schedules the transmission of the second message in an sTTI that coincides with at least one overlapping TTI in the set of TTIs of the repetition window, the UE may drop at least a portion of the transmission of a first message in the set of TTIs. Alternatively, the base station may avoid scheduling the uplink transmission of the second message in an sTTI that coincides with the set of TTIs of the repetition window to prevent collisions between transmissions of the first message and the second message.

A method for wireless communication is described. The method may include identifying that a first message is scheduled to be transmitted during each of a plurality of first TTIs of a repetition window, each of the first TTIs having a first priority, identifying that a second message is scheduled to be transmitted during a second TTI having a second priority that is higher than the first priority, where the second TTI coincides with at least one overlapping TTI of the first TTIs in the repetition window, and dropping transmission of at least a portion of the first message during the at least one overlapping TTI based at least in part on the first message being scheduled for transmission during each of the plurality of first TTIs of the repetition window and on the second TTI coinciding with the at least one overlapping TTI.

An apparatus for wireless communication is described. The apparatus may include means for identifying that a first message is scheduled to be transmitted during each of a plurality of first TTIs of a repetition window, each of the first TTIs having a first priority, means for identifying that a second message is scheduled to be transmitted during a second TTI having a second priority that is higher than the first priority, where the second TTI coincides with at least one overlapping TTI of the first TTIs in the repetition window, and means for dropping transmission of at least a portion of the first message during the at least one overlapping TTI based at least in part on the first message being scheduled for transmission during each of the plurality of first TTIs of the repetition window and on the second TTI coinciding with the at least one overlapping TTI.

Another apparatus for wireless communication is described. The apparatus may include a processor, memory in electronic communication with the processor, and instructions stored in the memory. The instructions may be operable to cause the processor to identify that a first message is scheduled to be transmitted during each of a plurality of first TTIs of a repetition window, each of the first TTIs having a first priority, identify that a second message is scheduled to be transmitted during a second TTI having a second priority that is higher than the first priority, where the second TTI coincides with at least one overlapping TTI of the first TTIs in the repetition window, and drop transmission of at least a portion of the first message during the at least one overlapping TTI based at least in part on the first message being scheduled for transmission during each of the plurality of first TTIs of the repetition window and on the second TTI coinciding with the at least one overlapping TTI.

A non-transitory computer-readable medium for wireless communication is described. The non-transitory computer-readable medium may include instructions operable to cause a processor to identify that a first message is scheduled to be transmitted during each of a plurality of first TTIs of a repetition window, each of the first TTIs having a first priority, identify that a second message is scheduled to be transmitted during a second TTI having a second priority that is higher than the first priority, where the second TTI coincides with at least one overlapping TTI of the first TTIs in the repetition window, and drop transmission of at least a portion of the first message during the at least one overlapping TTI based at least in part on the first message being scheduled for transmission during each of the plurality of first TTIs of the repetition window and on the second TTI coinciding with the at least one overlapping TTI.

In some examples of the methods, apparatus, and non-transitory computer readable medium described above, each of the plurality of TTIs has a first duration and the second TTI has a second duration, wherein the second duration is shorter than the first duration.

Some examples of the method, apparatus, and non-transitory computer-readable medium described above may further include processes, features, means, or instructions for transmitting the second message during the second TTI without inclusion of any portion of the first message. Some examples of the method, apparatus, and non-transitory computer-readable medium described above may further include processes, features, means, or instructions for transmitting the second message during the second TTI and transmitting the at least the portion of the first message during the second TTI. In some examples of the method, apparatus, and non-transitory computer-readable medium described above, the at least the portion of the first message transmitted in the second TTI includes hybrid automatic repeat request (HARQ) bits.

Some examples of the method, apparatus, and non-transitory computer-readable medium described above may further include processes, features, means, or instructions for dropping transmissions of the first message during subsequent TTIs in the repetition window based at least in part on the second TTI coinciding with the at least one overlapping TTI, the subsequent TTIs following the at least one overlapping TTI in the repetition window. Some examples of the method, apparatus, and non-transitory computer-readable medium described above may further include processes, features, means, or instructions for identifying that a third message may be scheduled to be transmitted during each of a plurality of third TTIs of another repetition window following the first TTIs of the repetition window, each of the third TTIs having the first duration, and transmitting the third message during the subsequent TTIs in the repetition window based at least in part on the transmissions of the first message being dropped during each of the subsequent TTIs.

Some examples of the method, apparatus, and non-transitory computer-readable medium described above may further include processes, features, means, or instructions for transmitting the first message during each subsequent TTI in the repetition window, the subsequent TTIs following the at least one overlapping TTI in the repetition window. Some examples of the method, apparatus, and non-transitory computer-readable medium described above may further include processes, features, means, or instructions for determining whether to transmit the first message during each subsequent TTI in the repetition window based at least in part on a length of the repetition window, the subsequent TTIs following the at least one overlapping TTI in the repetition window.

Some examples of the method, apparatus, and non-transitory computer-readable medium described above may further include processes, features, means, or instructions for determining that the length of the repetition window may be above a threshold and transmitting the first message during each subsequent TTI in the repetition window based at least in part on the determination. Some examples of the method, apparatus, and non-transitory computer-readable medium described above may further include processes, features, means, or instructions for determining that the length of the repetition window may be below a threshold and dropping transmissions of the first message during each subsequent TTI in the repetition window based at least in part on the determination.

Some examples of the method, apparatus, and non-transitory computer-readable medium described above may further include processes, features, means, or instructions for determining whether to transmit the first message during each subsequent TTI in the repetition window based at least in part on a number of the at least one overlapping TTI, the subsequent TTIs following the at least one overlapping TTI in the repetition window. Some examples of the method, apparatus, and non-transitory computer-readable medium described above may further include processes, features, means, or instructions for determining that the number of the at least one overlapping TTI may be below a threshold and transmitting the first message during each subsequent TTI in the repetition window based at least in part on the determination. Some examples of the method, apparatus, and non-transitory computer-readable medium described above may further include processes, features, means, or instructions for determining that the number of the at least one overlapping TTI may be above a threshold and dropping transmissions of the first message during each subsequent TTI in the repetition window based at least in part on the determination. In some examples of the method, apparatus, and non-transitory computer-readable medium described above may further include processes, features, means, or instructions for determining at least one of the first priority or the second priority based at least in part on a downlink control information or a scheduling timing of the first message or the second message.

Some examples of the method, apparatus, and non-transitory computer-readable medium described above may further include processes, features, means, or instructions for identifying a length of the repetition window, identifying a number of the at least one overlapping TTI, and determining whether to drop transmission of the first message during each subsequent TTI in the repetition window based at least in part on the identified length of the repetition window and the identified number of the at least one overlapping TTI, the subsequent TTIs following the at least one overlapping TTI in the repetition window.

In some examples of the method, apparatus, and non-transitory computer-readable medium described above, identifying that the second message may be scheduled to be transmitted during the second TTI having the second duration includes identifying that the second message may be scheduled to be transmitted during each of a plurality of second TTIs of another repetition window, where at least some of the second TTIs coincide with the at least one overlapping TTI of the first TTIs. Some examples of the method, apparatus, and non-transitory computer-readable medium described above may further include processes, features, means, or instructions for transmitting the second message during each of the second TTIs without inclusion of any portion of the first message.

Some examples of the method, apparatus, and non-transitory computer-readable medium described above may further include processes, features, means, or instructions for transmitting the second message during each of the second TTIs and transmitting the at least the portion of the first message during each of the second TTIs. In some examples of the method, apparatus, and non-transitory computer-readable medium described above, the at least the portion of the first message transmitted during each of the second TTIs includes HARQ bits.

Some examples of the method, apparatus, and non-transitory computer-readable medium described above may further include processes, features, means, or instructions for transmitting the second message during each of the second TTIs and transmitting the at least the portion of the first message during an initial TTI of the second TTIs. In some examples of the method, apparatus, and non-transitory computer-readable medium described above, the at least the portion of the first message transmitted in the initial TTI of the second TTIs includes HARQ bits.

In some examples of the method, apparatus, and non-transitory computer-readable medium described above, the repetition window may be associated with HARQ repetition or physical uplink shared channel (PUSCH) repetition. In some examples of the method, apparatus, and non-transitory computer-readable medium described above, the first message may be scheduled to be transmitted by a first UE and the second message may be scheduled to be transmitted by a second UE. In some examples of the method, apparatus, and non-transitory computer-readable medium described above, dropping transmission of the at least the portion of the first message includes dropping transmission of the at least the portion of the first message that coincides with the second TTI.

A method for wireless communication is described. The method may include identifying that a UE is configured to transmit a first message during each of a plurality of first TTIs of a repetition window, each of the first TTIs having a first priority, identifying that the UE is configured to transmit one or more second messages during one or more second TTIs each having a second priority that is higher than the first priority, and scheduling transmissions of the first message and the one or more second messages based at least in part on identifying that the UE is configured to transmit the first message during each of the plurality of first TTIs of the repetition window.

An apparatus for wireless communication is described. The apparatus may include means for identifying that a UE is configured to transmit a first message during each of a plurality of first TTIs of a repetition window, each of the first TTIs having a first priority, means for identifying that the UE is configured to transmit one or more second messages during one or more second TTIs each having a second priority that is higher than the first priority, and means for scheduling transmissions of the first message and the one or more second messages based at least in part on identifying that the UE is configured to transmit the first message during each of the plurality of first TTIs of the repetition window.

Another apparatus for wireless communication is described. The apparatus may include a processor, memory in electronic communication with the processor, and instructions stored in the memory. The instructions may be operable to cause the processor to identify that a UE is configured to transmit a first message during each of a plurality of first TTIs of a repetition window, each of the first TTIs having a first priority, identify that the UE is configured to transmit one or more second messages during one or more second TTIs each having a second priority that is higher than the first priority, and schedule transmissions of the first message and the one or more second messages based at least in part on identifying that the UE is configured to transmit the first message during each of the plurality of first TTIs of the repetition window.

A non-transitory computer-readable medium for wireless communication is described. The non-transitory computer-readable medium may include instructions operable to cause a processor to identify that a UE is configured to transmit a first message during each of a plurality of first TTIs of a repetition window, each of the first TTIs having a first priority, identify that the UE is configured to transmit one or more second messages during one or more second TTIs each having a second priority that is higher than the first priority, and schedule transmissions of the first message and the one or more second messages based at least in part on identifying that the UE is configured to transmit the first message during each of the plurality of first TTIs of the repetition window.

In some examples of the methods, apparatus, and non-transitory computer readable medium described above, each of the plurality of TTIs has a first duration and the second TTI has a second duration, wherein the second duration is shorter than the first duration.

In some examples of the method, apparatus, and non-transitory computer-readable medium described above, scheduling transmissions of the first message and the one or more second messages includes scheduling transmissions of the first message and the one or more second messages such that the one or more second messages may be not transmitted during second TTIs that coincide with the first TTIs of the repetition window.

DETAILED DESCRIPTION

In some wireless communications systems, a base station may configure a user equipment (UE) to transmit uplink signals in a set of transmission time intervals (TTIs) of a repetition window to increase the chances that the base station receives the uplink signals (e.g., for coverage enhancement). In some cases, however, the base station may also configure the UE or a different UE to transmit other uplink signals in a shortened TTI (sTTI) that coincides with at least one of the TTIs in the repetition window. In such cases, if the set of TTIs of the repetition window and the sTTI are allocated for uplink transmissions from a single UE, and the UE is not capable of transmitting simultaneously in a TTI and an sTTI (e.g., if the UE has access to one radio frequency (RF) chain), the UE may not be able to determine whether to transmit uplink signals in the TTI or in the sTTI. This may be detrimental to communications between the UE and the base station. Alternatively, if the TTI and the sTTI are allocated for uplink transmissions from different UEs, the transmissions in the TTI and the sTTI may collide (or interfere) and data may be lost.

As described herein, base stations and UEs may support efficient techniques for avoiding collisions between uplink transmissions in a set of TTIs of a repetition window and an uplink transmission in a coinciding sTTI. In one example, when a UE is scheduled to transmit a first message in a set of TTIs of a repetition window, and a transmission of a second message is scheduled in an sTTI that coincides with at least one of the TTIs of the repetition window, the UE may drop at least a portion of the transmission of the first message in the at least one TTI. In another example, when a base station identifies that a UE is configured to transmit a first message in a set of TTIs of a repetition window and the same UE or a different UE is configured to transmit a second message in an sTTI, the base station may schedule the first transmission of the first message and the second transmission of the second message such that there is no interference between the first and second transmissions (i.e., such that the sTTI does not coincide with the set of TTIs of the repetition window).

Aspects of the disclosure introduced above are described below in the context of a wireless communications system. Examples of processes and signaling exchanges that support collision avoidance for transmissions in coinciding TTIs are then described. Aspects of the disclosure are further illustrated by and described with reference to apparatus diagrams, system diagrams, and flowcharts that relate to collision avoidance for transmissions in coinciding TTIs.

Figure 1:
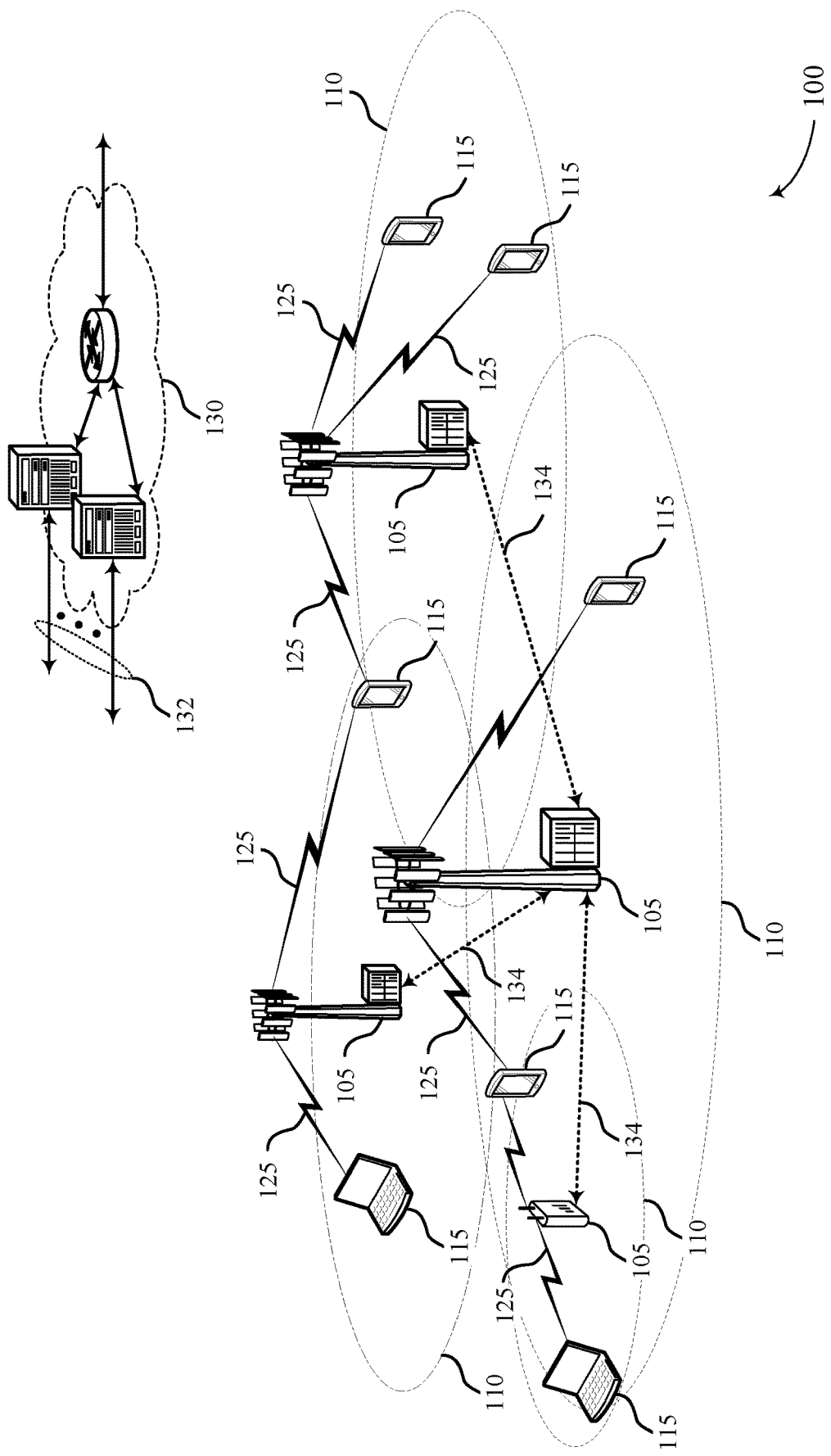
FIGS. 1 and 2 illustrate examples of wireless communications systems that support collision avoidance for transmissions in coinciding transmission time intervals (TTIs) in accordance with aspects of the present disclosure.

FIG. 1 illustrates an example of a wireless communications system 100 that supports collision avoidance for transmissions in coinciding TTIs in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)) or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and may therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, UEs 115 and base stations 105 may support retransmissions of data to increase the likelihood that data is received successfully. Hybrid automatic repeat request (HARQ) feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals of a communications resource in LTE or NR may be organized according to radio frames each having a duration of 10 milliseconds (ms). The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). In some cases, a subframe may be the smallest scheduling unit of the wireless communications system 100 and may be referred to as a TTI. In other cases, a smallest scheduling unit of the wireless communications system 100 may be shorter than a subframe or may be dynamically selected (e.g., in bursts of sTTIs or in selected component carriers using sTTIs).

The numerology employed within wireless communications system 100 (i.e., subcarrier size, symbol-period duration, and/or TTI duration) may be selected or determined based on a type of communication. The numerology may be selected or determined in view of an inherent tradeoff between latency for low latency applications and efficiency for other applications, for example. In some cases, a resource block may contain 12 consecutive subcarriers in the frequency domain and, for a normal cyclic prefix in each orthogonal frequency division multiplexing (OFDM) symbol, 7 consecutive OFDM symbols in the time domain (1 slot), or 84 resource elements. The number of bits carried by each resource element may depend on the modulation scheme (e.g., the configuration of symbols that may be selected during each symbol period). Thus, the more resource blocks that a UE receives and the higher the modulation scheme, the higher the data rate may be. Resource blocks may be defined according to other numerologies in various examples.

In some cases, a base station 105 may configure a UE 115 to transmit uplink signals in a set of TTIs of a repetition window to increase the chances that the uplink signals are received by the base station 105 (e.g., for coverage enhancement). In one example, a base station 105 may configure a UE 115 to transmit uplink data in multiple TTIs of a repetition window (e.g., using a PUSCH-EnhancementsConfig parameter). If PUSCH repetition is configured, the UE 115 may transmit uplink data for a given HARQ process in a set of TTIs of a repetition window upon detection of a PDCCH or enhanced PDCCH (ePDCCH) with a specific format (e.g., downlink control information (DCI) format 0C), where the PDCCH or ePDCCH indicates the number of TTIs in the repetition window. For instance, the UE 115 may transmit the uplink data in TTIs n+$k_i$ where:

$$i=0,1,\ldots,N-1 \quad (1)$$

$$4 \leq k_0 \leq k_1 \leq \ldots \leq k_{N-1} \quad (2)$$

N is given by the repetition number field in the DCI, and n is the last TTI in which the PDCCH/ePDCCH is transmitted. The DCI may be used to indicate priority. For example, the DCI may be used to determine priority based at least in part on when the DCI is detected (e.g., scheduling timing) or based on a value of the DCI.

In another example, a base station 105 may configure a UE 115 to transmit HARQ data in a set of TTIs of a repetition window (e.g., using a HARQ repetition parameter). If HARQ repetition is configured, the UE 115 may transmit a HARQ response in a set of TTIs of a repetition window upon detection of a PDSCH transmission. For instance, the UE 115 may transmit the HARQ response in TTIs n, n+1, . . . , n+$N_{ANRep}$−1 for a PDSCH received in TTI n−4. The factor $N_{ANRep}$ corresponds to the number of TTIs in the repetition window and can be provided by the base station 105 with the HARQ repetition configuration.

In the examples described above, because the UE 115 may transmit the uplink signals in a set of TTIs of a repetition window, there may be a higher chance that a base station 105 will be able to receive the uplink signals from the UE 115. In some cases, however, the base station 105 may also configure the UE 115 or a different UE 115 to transmit other uplink signals in a shortened TTI (sTTI) that coincides with at least one of the TTIs in the repetition window. In such cases, if the set of TTIs of the repetition window and the sTTI are allocated for uplink transmissions from a single UE, and the UE is not capable of transmitting in a TTI and an sTTI simultaneously (e.g., if the uplink transmissions are scheduled on the same carrier or on intra-band carriers and the UE has access to one RF chain according to the parameter simultaneousTx-differentTx-duration), the UE may not be able to determine whether to transmit uplink signals in the TTI or in the sTTI. This may be detrimental to communications between the UE 115 and the base station 105. Alternatively, if the TTI and the sTTI are allocated for uplink transmissions from different UEs, the transmissions in the TTI and the sTTI may collide and data may be lost. Wireless communications system 100 may support efficient techniques for avoiding collisions between uplink transmissions in a set of TTIs of a repetition window and an uplink transmission in a coinciding sTTI.

Figure 2:
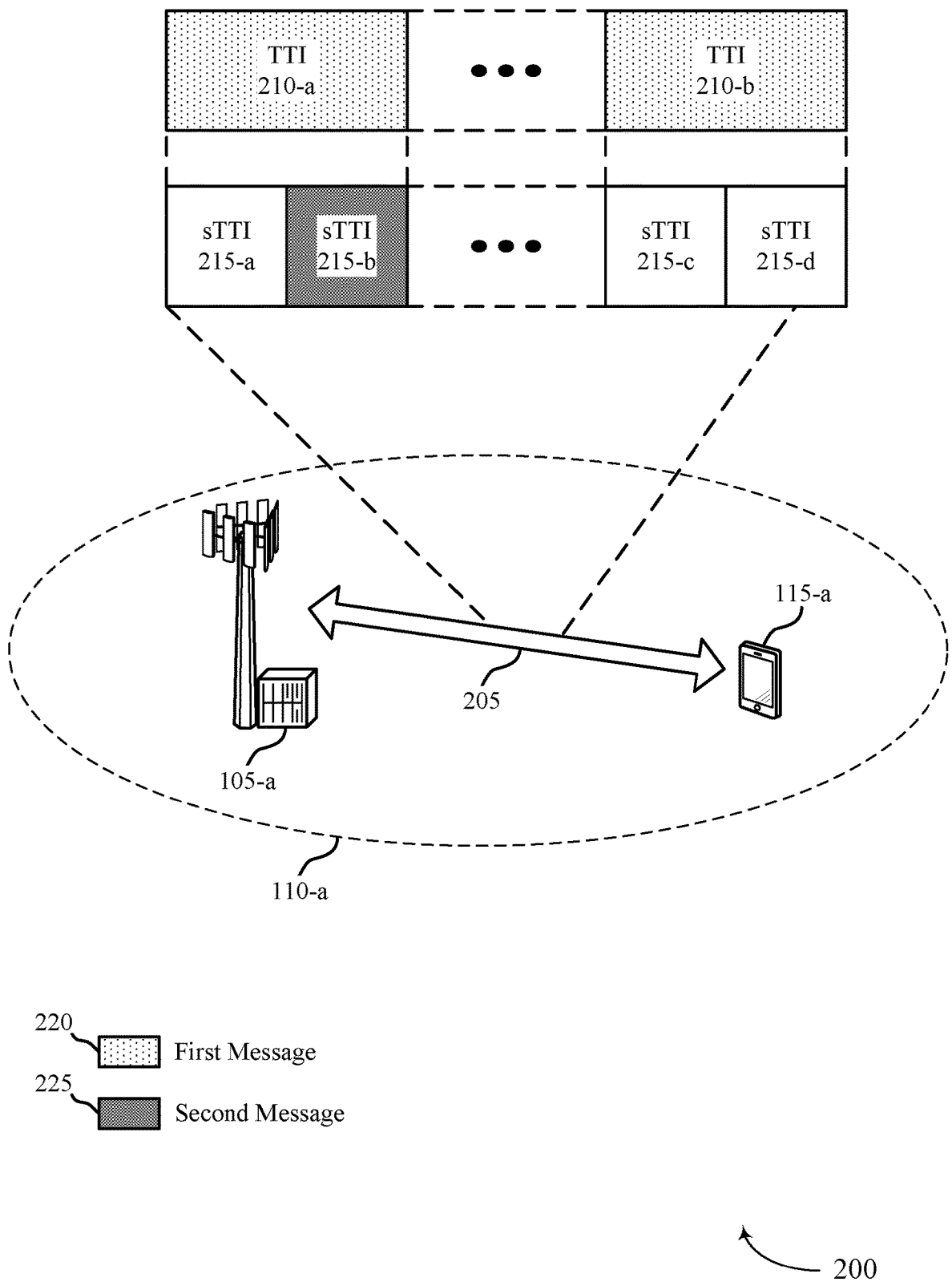

FIG. 2 illustrates an example of a wireless communications system 200 that supports collision avoidance for transmissions in coinciding TTIs in accordance with various aspects of the present disclosure. Wireless communications system 200 includes base station 105-a and UE 115-a, which may be examples of the corresponding devices described with reference to FIG. 1. Base station 105-a may communicate with UEs 115 (including UE 115-a) within coverage area 110-a. Wireless communications system 200 may implement aspects of wireless communications system 100. For example, wireless communications system 200 may support efficient techniques for avoiding collisions between uplink transmissions in a set of TTIs 210 of a repetition window (e.g., PUCCH or PUSCH transmissions) and an uplink transmission in a coinciding sTTI 215 (e.g., an sPUCCH or sPUSCH transmission).

Base station 105-a may communicate with UE 115-a on resources of a carrier 205. In some cases, UE 115-a may transmit uplink signals to base station 105-a during TTIs 210-a through 210-b or sTTIs 215-a through 215-d on the carrier 205. In other cases, UE 115-a may transmit uplink signals to base station 105-a during TTIs 210 on the carrier 205, and UE 115-a or another UE 115 may transmit uplink signals to base station 105-a during sTTIs 215 on another carrier. In wireless communications system 200, a TTI 210 may span a subframe, and an sTTI 215 may span a single slot, three symbols, or two symbols. FIG. 2 shows an example where the sTTI 215 spans a single slot.

In the example of FIG. 2, UE 115-a may be configured to transmit a first message 220 in a set of TTIs 210 of a repetition window to increase the chances that the first message is received by base station 105-a (e.g., for coverage enhancement). In addition, UE 115-a or another UE 115 may be configured to transmit a second message 225 in sTTI 215-b. As illustrated, however, sTTI 215-b may coincide with TTI 210-a. As a result of this, transmissions made during sTTI 215-b may interfere with transmissions made during TTI 210-a. In order to prevent a collision between a transmission of the first message 220 in TTI 210-a and a transmission of the second message 225 in sTTI 215-b, UE 115-a may drop transmission of at least a portion of the first message 220. In one example, if the first message 220 and the second message 225 are scheduled to be transmitted by UE 115-a, UE 115-a may drop the entire transmission of the first message 220 in TTI 210-a since UE 115-a may not be able to simultaneously transmit the first message 220 in TTI 210-a and the second message 225 in sTTI 215-b. In another example, if the first message 220 is scheduled to be transmitted by UE 115-a and the second message 225 is scheduled to be transmitted by another UE 115, UE 115-a may drop the portion of the transmission of the first message 220 in TTI 210-a that coincides with sTTI 215-b. In some cases, UE 115-a may receive an indication (or command) to avoid transmitting the portion of the first message 220 in TTI 210-a that coincides with sTTI 215-b. In other examples, the UE 115-a may drop all of or a portion of the second message 225.

Since UE 115-a may drop at least the portion of the first message 220 in TTI 210-a, it may, in some cases, be appropriate for UE 115-a to transmit the dropped portion of the first message 220 in sTTI 215-b. For instance, if there is a chance that base station 105-a may receive a transmission of the dropped portion in sTTI 215-b (e.g., if the repetition window is configured to allow UE 115-a to use a reduced power for transmissions of the first message rather than being configured when UE 115-a is experiencing poor coverage), UE 115-a may transmit the dropped portion of the first message 220 in sTTI 215-b (e.g., HARQ data originally scheduled to be transmitted in a PUSCH or PUCCH of TTI 210-a). In other cases, however, if it is unlikely that base station 105-a would receive a transmission of the dropped portion in sTTI 215-b (e.g., when the repetition window is configured to improve the chances that the first message 220 is received when UE 115-a is experiencing poor coverage), UE 115-a may transmit the second message 225 in sTTI 215-b without including any portion of the first message 220.

The techniques described above are directed to handling collisions between transmissions of a first message 220 in a set of TTIs 210 of a repetition window and a transmission of a second message 225 in an sTTI 215. In other aspects, however, base station 105-a may configure UE 115-a or another UE to transmit the second message 225 in a repetition window including a set of sTTIs. In such aspects, UE 115-a may use similar techniques to those described above to handle collisions between TTIs in the first repetition window configured for the first message 220 and sTTIs in the second repetition window configured for the second message 225. In particular, if the first message 220 and second message 225 are scheduled to be transmitted by UE 115-a, UE 115-a may drop the entire transmissions of the first message 220 in the TTIs 210 of the first repetition window that coincide with the sTTIs 215 in the second repetition window. Alternatively, if the first message 220 is scheduled to be transmitted by UE 115-a and the second message 225 is scheduled to be transmitted by another UE, UE 115-a may drop the portions of the transmissions of the first message 220 in the TTIs 210 of the first repetition window that coincide with the sTTIs 215 in the second repetition window.

As for the transmissions in the sTTIs 215 of the second repetition window, UE 115-a may, in one example, transmit the second message 225 in the sTTIs 215 of the second repetition window without including the first message 220 (e.g., if it is unlikely that the transmission of the portion of the first message 220 in sTTIs 215 will be received by base station 105-a). In another example, UE 115-a may transmit the dropped portion of the first message 220 (e.g., HARQ data) in each of the sTTIs 215 of the second repetition window (e.g., if there is a chance that the transmission of the portion of the first message 220 in sTTIs 215 will be received by base station 105-a). In yet another example, UE 115-a may transmit the dropped portion of the first message 220 (e.g., HARQ data) in an initial (i.e., a first) sTTI 215-a of the sTTIs 215 of the second repetition window (e.g., if it is likely that the transmission of the portion of the first message 220 in the single sTTI 215 will be received by base station 105-a).

Figure 3A:
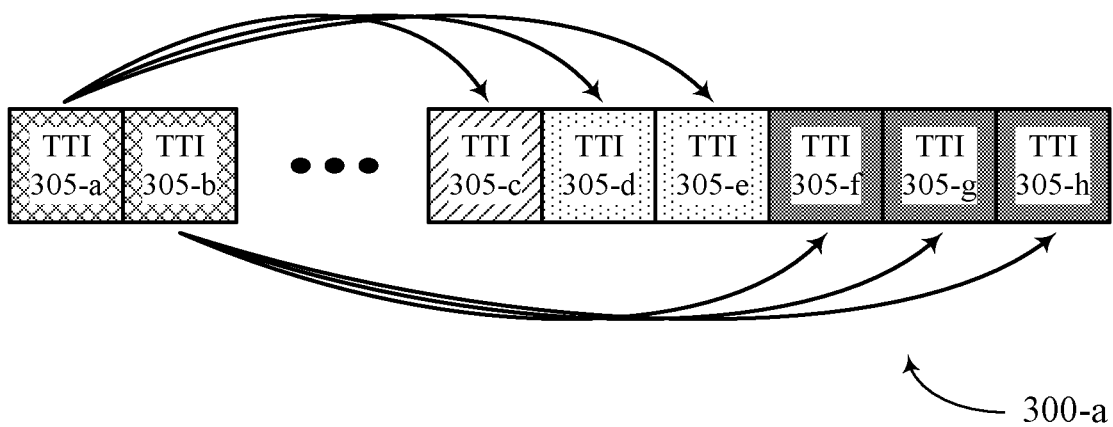
FIGS. 3A and 3B illustrate examples of transmissions in subsequent TTIs of a repetition window in accordance with aspects of the present disclosure.
Figure 3B:
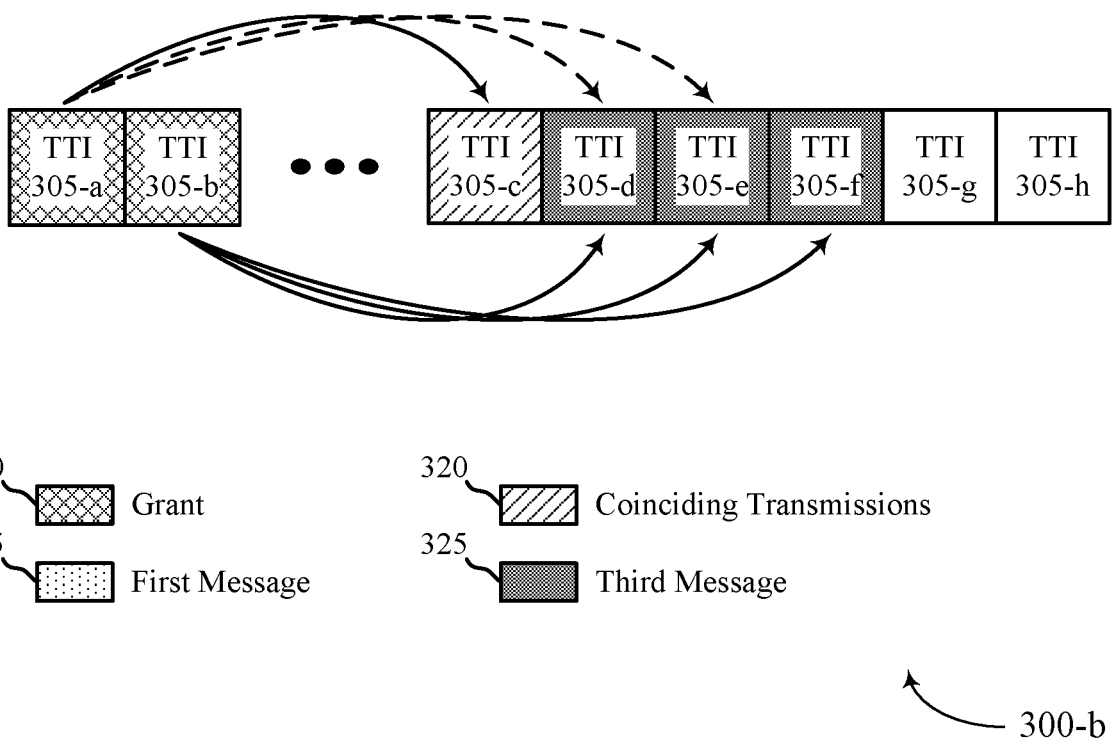

In addition to the techniques described above for avoiding collisions in a TTI 210 of a repetition window that coincides with an sTTI 215, it may be appropriate to determine whether to transmit the first message 220 in subsequent TTIs 210 of the repetition window following the TTI 210 that coincides with the sTTI 215. FIGS. 3A and 3B illustrate examples of transmissions 300 in subsequent TTIs of a repetition window in accordance with various aspects of the present disclosure. In these examples, base station 105-a may transmit a grant 310 in TTI 305-a (e.g., TTI N−1) to configure UE 115-a to transmit a first message 315 in a first repetition window with a length of three (e.g., in TTIs N+3, N+4, and N+5), and base station 105-a may transmit another grant 310 in TTI 305-b (e.g., in TTI N) to configure UE 115-*a* to transmit a third message 325 in a second repetition window with a length of three (e.g., in TTIs N+6, N+7, and N+8).

UE 115-*a* may receive the grants and determine to transmit the first message 315 in TTIs 305-*c*, 305-*d*, and 305-*e*. As illustrated, however, a transmission of a second message may be scheduled in an sTTI that coincides with TTI 305-*c* (i.e., transmissions of the second message are shown as coinciding transmissions 320). Accordingly, UE 115-*a* may use the techniques described with reference to FIG. 2 to avoid collisions in TTI 305-*c*. In particular, UE 115-*a* may drop at least a portion of a transmission of the first message 315 in TTI 305-*c*. Afterwards, it may be appropriate for UE 115-*a* to determine whether to transmit the first message 315 in the subsequent TTIs of the first repetition window. In one example, UE 115-*a* may be configured to either transmit the first message 315 or drop transmission of the first message 315 in the subsequent TTIs of the first repetition window, and, in another example, UE 115-*a* may be configured to determine whether to transmit the first message 315 in the subsequent TTIs of the first repetition window.

In the example of FIG. 3A, there may be a chance that first message 315 will be received by base station 105-*a* after the transmission of first message 315 is dropped in TTI 305-*c* (e.g., when UE 115-*a* is experiencing good coverage), and UE 115-*a* may transmit first message 315 in the subsequent TTIs of the first repetition window (e.g., in TTIs 305-*d* and 305-*e*). In the example of FIG. 3B, it may be unlikely that first message 315 will be received by base station 105-*a* after the transmission of first message 315 is dropped in TTI 305-*c* (e.g., when UE 115-*a* is experiencing poor coverage), and UE 115-*a* may drop the transmission of first message 315 in the subsequent TTIs of the first repetition window (e.g., in TTIs 305-*d* and 305-*e*). In this example, UE 115-*a* may accelerate the transmissions of third message 325 in the second repetition window based on dropping the transmission of first message 315 in the subsequent TTIs of the first repetition window. That is, UE 115-*a* may transmit third message 325 in TTIs originally scheduled to be used for transmissions of first message 315 in the first repetition window (e.g., in TTIs 305-*d* and 305-*e*).

In some aspects, rather than being configured to either transmit first message 315 or drop transmissions of first message 315 in the subsequent TTIs of the first repetition window, UE 115-*a* may determine whether to transmit first message 315 or drop transmissions of first message 315 in subsequent TTIs of the first repetition window based on several factors. In one example, UE 115-*a* may determine whether to transmit the first message 315 or drop transmissions of first message 315 in subsequent TTIs of the first repetition window based on a length of the first repetition window. In this example, if the length of the first repetition window is above a threshold, UE 115-*a* may transmit the first message 315 in subsequent TTIs of the first repetition window (as illustrated in FIG. 3A). Alternatively, if the length of the first repetition window is below a threshold, UE 115-*a* may drop transmission of the first message 315 in subsequent TTIs of the first repetition window (as illustrated in FIG. 3B).

In another example, UE 115-*a* may determine whether to transmit first message 315 or drop transmissions of first message 315 in subsequent TTIs of the first repetition window based on a number of TTIs coinciding with one or more sTTIs used to transmit a second message (e.g., such as TTI 305-*c*). The number of TTIs coinciding with one or more sTTIs used to transmit a second message may be indicated by a parameter PUSCH Repetition-Dropped. In this example, if the number of TTIs coinciding with one or more sTTIs used to transmit a second message is below a threshold, UE 115-*a* may transmit first message 315 in subsequent TTIs of the first repetition window (as illustrated in FIG. 3A). Alternatively, if the number of TTIs coinciding with one or more sTTIs used to transmit a second message is above a threshold, UE 115-*a* may drop transmission of first message 315 in subsequent TTIs of the first repetition window (as illustrated in FIG. 3B).

In yet another example, UE 115-*a* may determine whether to transmit first message 315 or drop transmissions of first message 315 in subsequent TTIs of the first repetition window based on a length of the first repetition window and a number of TTIs coinciding with one or more sTTIs used to transmit a second message (e.g., such as TTI 305-*c*). In this example, if the length of the first repetition window is above a threshold and the number of TTIs coinciding with one or more sTTIs used to transmit a second message is below a threshold, UE 115-*a* may transmit first message 315 in subsequent TTIs of the first repetition window (as illustrated in FIG. 3A). Alternatively, if the length of the first repetition window is below a threshold and the number of TTIs coinciding with one or more sTTIs used to transmit a second message is above a threshold, UE 115-*a* may drop transmission of first message 315 in subsequent TTIs of the first repetition window (as illustrated in FIG. 3B).

In some examples, each of the first TTIs have a first priority. The first priority may be a priority level assigned to the first TTIs. In some examples, the first priority of the first TTIs may be determined based on a type of data to be transmitted in the first TTIs. One or more second TTIs may have a second priority. In some examples, the second priority is higher than the first priority. For example, the second TTI may have higher priority data than the first TTIs.

The second priority may be assigned to the second TTIs or may be determined based on a type of data to be transmitted in the second TTIs. In other examples, the priority levels are determined based at least in part on a duration or length of the TTIs. In some examples, the priority levels are determined based on the content of the channels associated with the TTIs. In other examples, the priority is indicated or determined by a DCI associated with the data or transmission. In other examples, the priority is determined by when the DCI is sent (e.g., a second DCI would have higher priority). In other words, the priority may be based on the DCI or a scheduling of the DCI. Some of these examples where DCI is used to determine priority may be for the case of a dynamic PUSCH with repetition. In some examples, determining at least one of the first priority or the second priority may be based at least in part on a DCI or a scheduling timing of one of the first message or the second message. For example, the first priority may be based on a DCI or when a DCI is detected for the first message. The second priority may be based on a DCI or when a DCI is detected for the second message.

Figure 4:
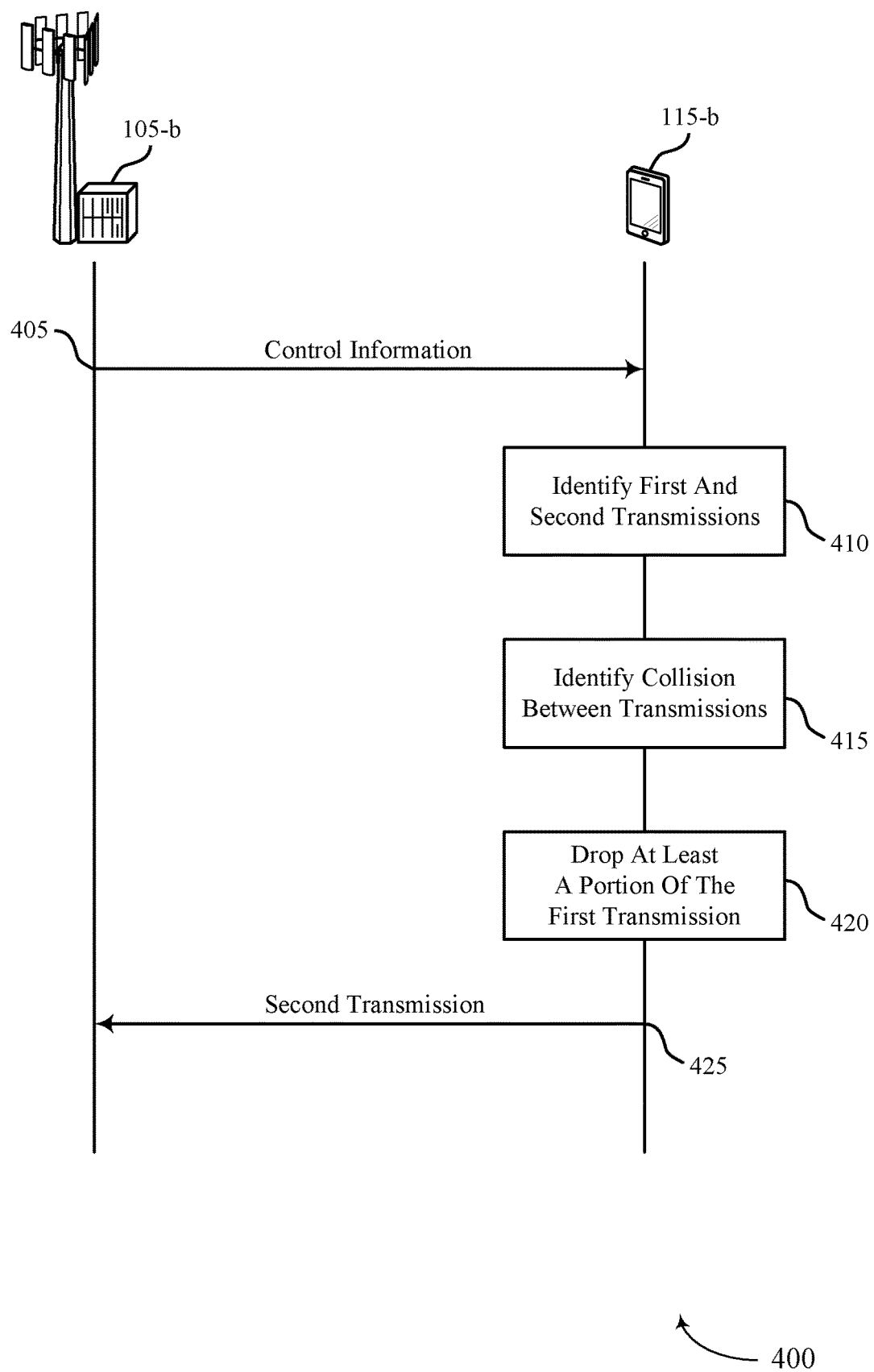
FIG. 4 illustrates an example of a process flow that supports collision avoidance for transmissions in coinciding TTIs in accordance with aspects of the present disclosure.

FIG. 4 illustrates an example of a process flow 400 that supports collision avoidance for transmissions in coinciding TTIs in accordance with various aspects of the present disclosure. Process flow 400 illustrates aspects of techniques performed by a base station 105-*b*, which may be an example of a base station 105 described with reference to FIGS. 1-3. Process flow 400 also illustrates aspects of techniques performed by a UE 115-*b*, which may be an example of a UE 115 described with reference to FIGS. 1-3.

At 405, base station 105-*b* may transmit control information to UE 115-*b* to schedule uplink transmissions from UE 115-*b* to base station 105-*b*. At 410, UE 115-*b* may identify that a first message is scheduled to be transmitted during each of a set of TTIs of a repetition window, and UE 115-*b* may identify that a second message is scheduled to be transmitted during an sTTI. At 415, UE 115-*b* may identify a collision between a first transmission of the first message and a second transmission of the second message based on determining that the sTTI allocated for the second transmission of the second message coincides with at least one overlapping TTI of the set of TTIs in the repetition window allocated for the first transmission of the first message. The first message may be scheduled to be transmitted by UE 115-*b* and the second message may be scheduled to be transmitted by UE 115-*b* or a different UE 115.

Thus, at 420, UE 115-*b* may drop at least a portion of the first transmission in the overlapping TTI based on the first message being scheduled for transmission during each of the set of TTIs of the repetition window and on the sTTI coinciding with the at least one overlapping TTI. At 425, UE 115-*b* may then transmit the second message during the sTTI. In some cases, UE 115-*b* may transmit the second message during the sTTI without inclusion of any portion of the first message. In other cases, UE 115-*b* may transmit the second message during the sTTI and transmit at least the portion of the first message during the sTTI (i.e., the portion of the first message dropped in the transmission in the overlapping TTI). In such cases, at least the portion of the first message transmitted in the sTTI may be HARQ bits.

In the example of FIG. 4, base station 105-*b* may schedule a first transmission of a first message in a set of TTIs and a second transmission of a second message in an sTTI that coincides with at least one overlapping TTI in the set of TTIs. In other examples, however, in order to avoid collisions between transmissions in TTIs and sTTIs, base station 105-*b* may avoid scheduling transmissions in an sTTI that coincides with TTIs in a set of TTIs of a repetition window allocated for other transmissions. In particular, base station 105-*b* may schedule transmissions of a first message and a second message such that the second message is not transmitted during sTTIs that coincide with a set of TTIs of a repetition window used for a transmission of the first message.

Figure 5:
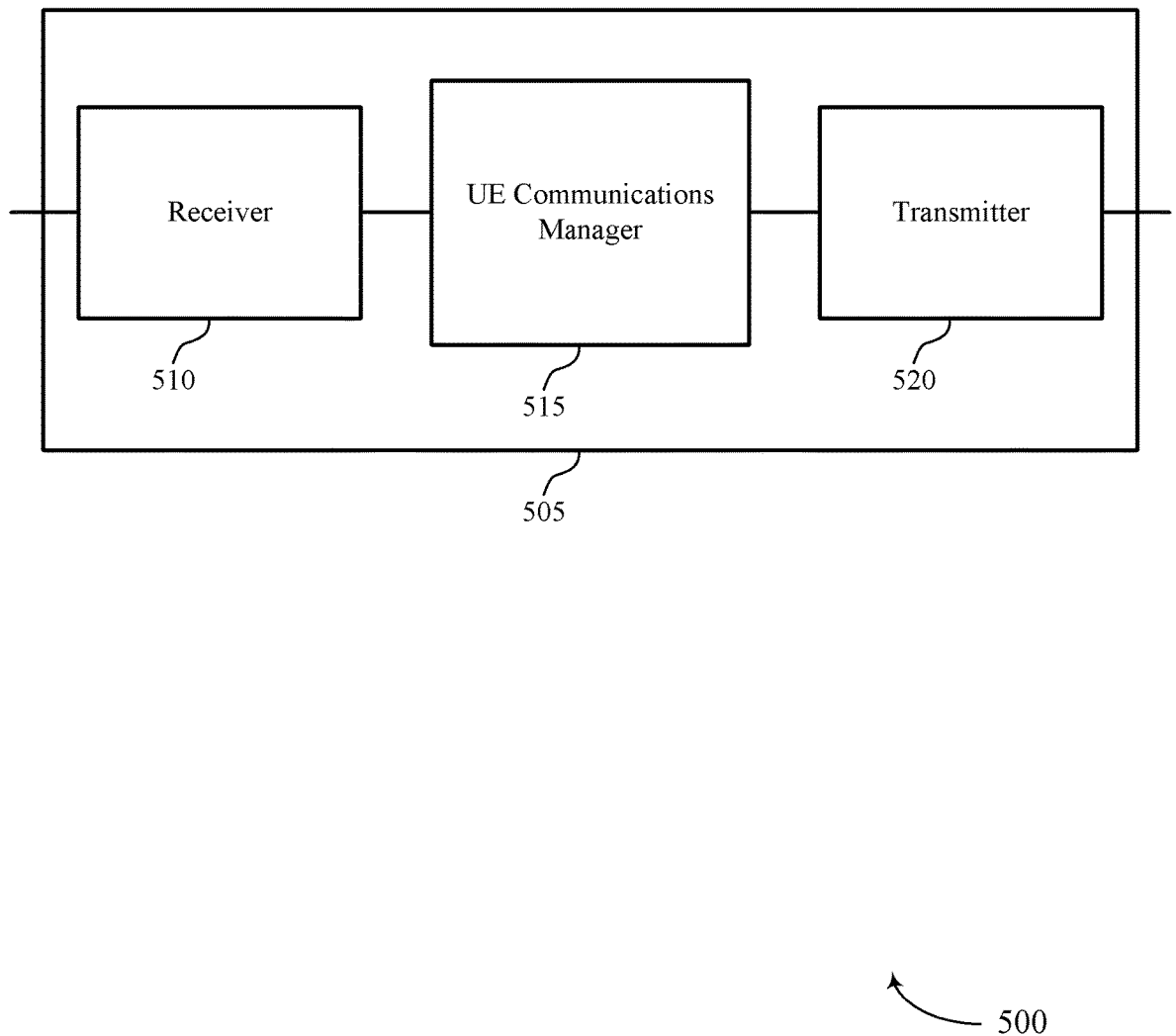
FIGS. 5 and 6 show block diagrams of a device that supports collision avoidance for transmissions in coinciding TTIs in accordance with aspects of the present disclosure.

FIG. 5 shows a block diagram 500 of a wireless device 505 that supports collision avoidance for transmissions in coinciding TTIs in accordance with aspects of the present disclosure. Wireless device 505 may be an example of aspects of a UE 115 as described herein. Wireless device 505 may include receiver 510, UE communications manager 515, and transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to collision avoidance for transmissions in coinciding TTIs, etc.). Information may be passed on to other components of the wireless device 505. The receiver 510 may be an example of aspects of the transceiver 735 described with reference to FIG. 7. The receiver 510 may utilize a single antenna or a set of antennas.

UE communications manager 515 may be an example of aspects of the UE communications manager 715 described with reference to FIG. 7. UE communications manager 515 and/or at least some of its various sub-components may be implemented in hardware, software executed by a processor, firmware, or any combination thereof. If implemented in software executed by a processor, the functions of the UE communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

UE communications manager 515 and/or at least some of its various sub-components may be physically located at various positions, including being distributed such that portions of functions are implemented at different physical locations by one or more physical devices. In some examples, UE communications manager 515 and/or at least some of its various sub-components may be a separate and distinct component in accordance with various aspects of the present disclosure. In other examples, UE communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 515 may identify that a first message is scheduled to be transmitted during each of a set of first TTIs of a repetition window, each of the first TTIs having a first priority, identify that a second message is scheduled to be transmitted during a second TTI having a second priority that is higher than the first priority, where the second TTI coincides with at least one overlapping TTI of the first TTIs in the repetition window, and drop transmission of at least a portion of the first message during the at least one overlapping TTI based on the first message being scheduled for transmission during each of the set of first TTIs of the repetition window and on the second TTI coinciding with the at least one overlapping TTI.

Transmitter 520 may transmit signals generated by other components of the wireless device 505. In some examples, transmitter 520 may be collocated with a receiver 510 in a transceiver module. For example, transmitter 520 may be an example of aspects of transceiver 735 described with reference to FIG. 7. Transmitter 520 may utilize a single antenna or a set of antennas.

Figure 6:
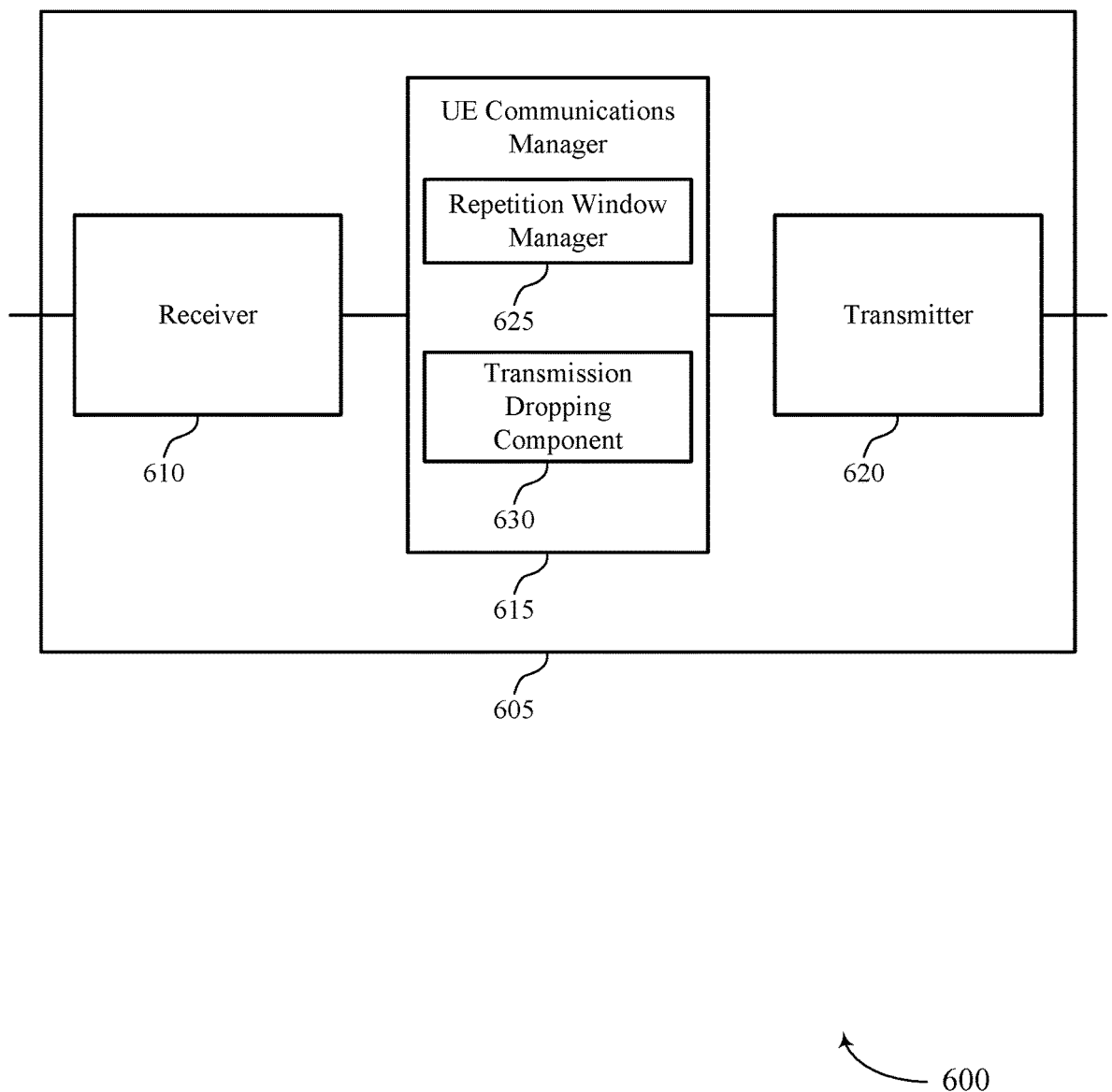

FIG. 6 shows a block diagram 600 of a wireless device 605 that supports collision avoidance for transmissions in coinciding TTIs in accordance with aspects of the present disclosure. Wireless device 605 may be an example of aspects of a wireless device 505 or a UE 115 as described with reference to FIG. 5. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to collision avoidance for transmissions in coinciding TTIs, etc.). Information may be passed on to other components of wireless device 605. Receiver 610 may be an example of aspects of transceiver 735 described with reference to FIG. 7. Receiver 610 may utilize a single antenna or a set of antennas.

UE communications manager 615 may be an example of aspects of the UE communications manager 715 described with reference to FIG. 7. UE communications manager 615 may include repetition window manager 625 and transmission dropping component 630.

Repetition window manager 625 may identify that a first message is scheduled to be transmitted during each of a set of first TTIs of a repetition window, each of the first TTIs having a first priority, and repetition window manager 625 may identify that a second message is scheduled to be transmitted during a second TTI having a second priority that is higher than the first priority, where the second TTI coincides with at least one overlapping TTI of the first TTIs in the repetition window. Transmission dropping component 630 may drop transmission of at least a portion of the first message during the at least one overlapping TTI based on the first message being scheduled for transmission during each of the set of first TTIs of the repetition window and on the second TTI coinciding with the at least one overlapping TTI.

In some cases, the repetition window is associated with HARQ repetition or PUSCH repetition. In some cases, the first message is scheduled to be transmitted by a first UE and the second message is scheduled to be transmitted by a second UE. In some cases, dropping transmission of the at least the portion of the first message includes dropping transmission of the at least the portion of the first message that coincides with the second TTI.

In some cases, transmitter 620 may transmit the second message during the second TTI without inclusion of any portion of the first message. In some cases, transmitter 620 may transmit the second message during the second TTI and transmit the at least the portion of the first message during the second TTI. In some cases, the at least the portion of the first message transmitted in the second TTI includes HARQ bits. In some cases, transmission dropping component 630 may drop transmissions of the first message during subsequent TTIs in the repetition window based on the second TTI coinciding with the at least one overlapping TTI, the subsequent TTIs following the at least one overlapping TTI in the repetition window.

In some cases, repetition window manager 625 may identify that a third message is scheduled to be transmitted during each of a set of third TTIs of another repetition window following the first TTIs of the repetition window, each of the third TTIs having the first duration, and transmitter 620 may transmit the third message during the subsequent TTIs in the repetition window based on the transmissions of the first message being dropped during each of the subsequent TTIs. In some cases, transmitter 620 may transmit the first message during each subsequent TTI in the repetition window, the subsequent TTIs following the at least one overlapping TTI in the repetition window.

In some cases, repetition window manager 625 may determine whether to transmit the first message during each subsequent TTI in the repetition window based on a length of the repetition window, the subsequent TTIs following the at least one overlapping TTI in the repetition window. In some cases, repetition window manager 625 may determine that the length of the repetition window is above a threshold, and transmitter 620 may transmit the first message during each subsequent TTI in the repetition window based on the determination. In some cases, repetition window manager 625 may determine that the length of the repetition window is below a threshold, and transmission dropping component 630 may drop transmissions of the first message during each subsequent TTI in the repetition window based on the determination.

In some cases, repetition window manager 625 may determine whether to transmit the first message during each subsequent TTI in the repetition window based on a number of the at least one overlapping TTI, the subsequent TTIs following the at least one overlapping TTI in the repetition window. In some cases, repetition window manager 625 may determine that the number of the at least one overlapping TTI is below a threshold, and transmitter 620 may transmit the first message during each subsequent TTI in the repetition window based on the determination. In some cases, repetition window manager 625 may determine that the number of the at least one overlapping TTI is above a threshold, and transmission dropping component 630 may drop transmissions of the first message during each subsequent TTI in the repetition window based on the determination.

In some cases, repetition window manager 625 may identify a length of the repetition window and identify a number of the at least one overlapping TTI, and transmission dropping component 630 may determine whether to drop transmission of the first message during each subsequent TTI in the repetition window based on the identified length of the repetition window and the identified number of the at least one overlapping TTI, the subsequent TTIs following the at least one overlapping TTI in the repetition window.

In some cases, repetition window manager 625 may identify that the second message is scheduled to be transmitted during each of a set of second TTIs of another repetition window, where at least some of the second TTIs coincide with the at least one overlapping TTI of the first TTIs. In some cases, transmitter 620 may transmit the second message during each of the second TTIs without inclusion of any portion of the first message. In some cases, transmitter 620 may transmit the second message during each of the second TTIs and transmit the at least the portion of the first message during each of the second TTIs. In some cases, the at least the portion of the first message transmitted during each of the second TTIs includes HARQ bits. In some cases, transmitter 620 may transmit the second message during each of the second TTIs and transmit the at least the portion of the first message during an initial TTI of the second TTIs. In some cases, at least the portion of the first message transmitted during each of the second TTIs includes HARQ bits.

Transmitter 620 may transmit signals generated by other components of wireless device 605. In some examples, the transmitter 620 may be collocated with a receiver 610 in a transceiver module. For example, the transmitter 620 may be an example of aspects of the transceiver 735 described with reference to FIG. 7. The transmitter 620 may utilize a single antenna or a set of antennas.

Figure 7:
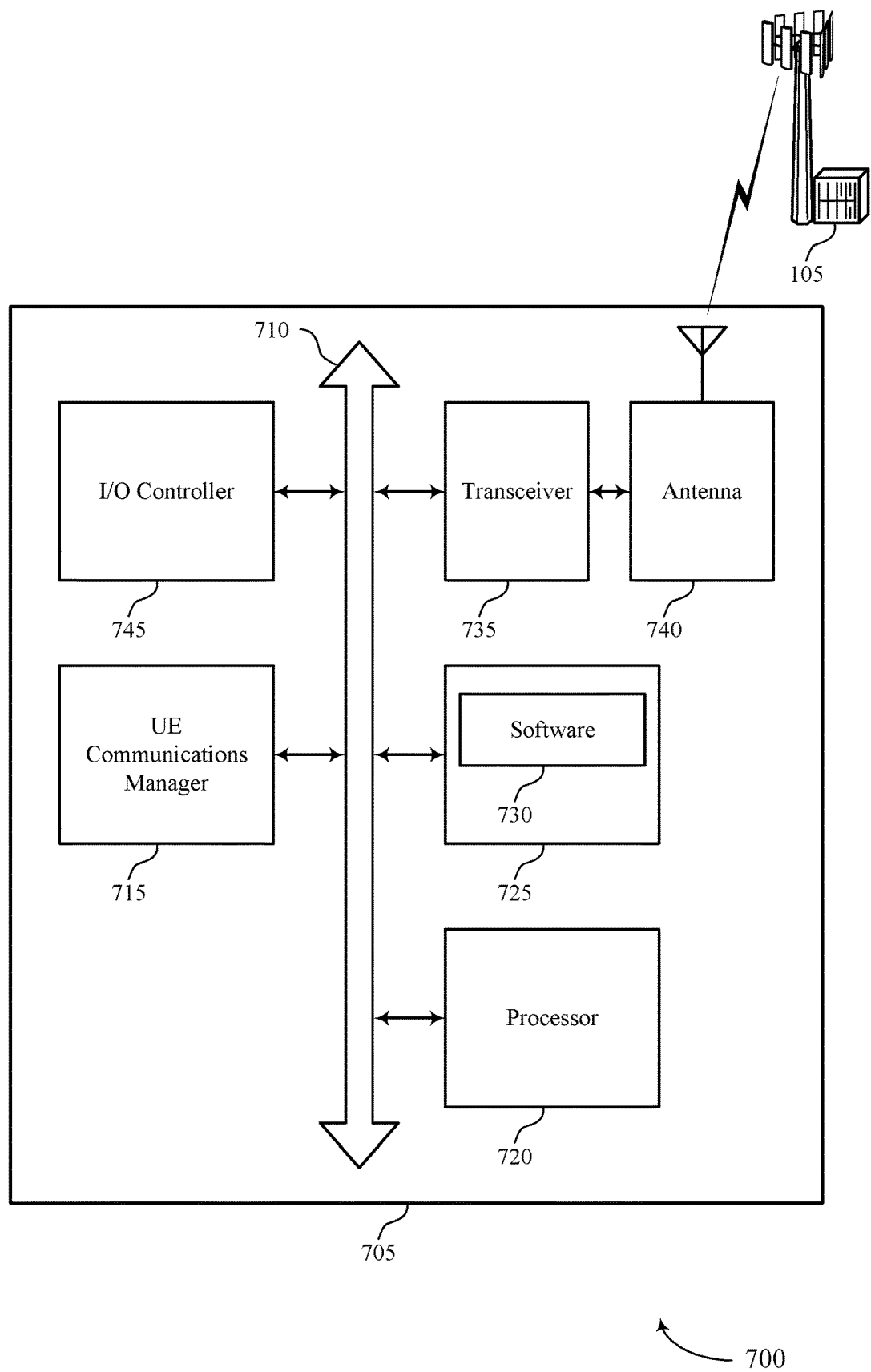
FIG. 7 illustrates a block diagram of a system including a user equipment (UE) that supports collision avoidance for transmissions in coinciding TTIs in accordance with aspects of the present disclosure.

FIG. 7 shows a diagram of a system 700 including a device 705 that supports collision avoidance for transmissions in coinciding TTIs in accordance with aspects of the present disclosure. Device 705 may be an example of or include the components of wireless device 505, wireless device 605, or a UE 115 as described above, e.g., with reference to FIGS. 5 and 6. Device 705 may include components for bi-directional voice and data communications including components for transmitting and receiving communications, including UE communications manager 715, processor 720, memory 725, software 730, transceiver 735, antenna 740, and I/O controller 745. These components may be in electronic communication via one or more buses (e.g., bus 710). Device 705 may communicate wirelessly with one or more base stations 105.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting collision avoidance for transmissions in coinciding TTIs).

Memory 725 may include random-access memory (RAM) and read-only memory (ROM). Memory 725 may store computer-readable, computer-executable software 730 including instructions that, when executed, cause processor 720 to perform various functions described herein. In some cases, memory 725 may contain, among other things, a basic input/output system (BIOS) which may control basic hardware or software operation such as the interaction with peripheral components or devices.

Software 730 may include code to implement aspects of the present disclosure, including code to support collision avoidance for transmissions in coinciding TTIs. Software 730 may be stored in a non-transitory computer-readable medium such as system memory or other memory. In some cases, software 730 may not be directly executable by the processor but may cause a computer (e.g., when compiled and executed) to perform functions described herein.

Transceiver 735 may communicate bi-directionally, via one or more antennas, wired, or wireless links as described above. For example, transceiver 735 may represent a wireless transceiver and may communicate bi-directionally with another wireless transceiver. Transceiver 735 may also include a modem to modulate the packets and provide the modulated packets to the antennas for transmission, and to demodulate packets received from the antennas.

In some cases, device 705 may include a single antenna 740. However, in some cases, device 705 may have more than one antenna 740, which may be capable of concurrently transmitting or receiving multiple wireless transmissions.

I/O controller 745 may manage input and output signals for device 705. I/O controller 745 may also manage peripherals not integrated into device 705. In some cases, I/O controller 745 may represent a physical connection or port to an external peripheral. In some cases, I/O controller 745 may utilize an operating system such as iOS®, ANDROID®, MS-DOS®, MS-WINDOWS®, OS/2®, UNIX®, LINUX®, or another known operating system. In other cases, I/O controller 745 may represent or interact with a modem, a keyboard, a mouse, a touchscreen, or a similar device. In some cases, I/O controller 745 may be implemented as part of a processor. In some cases, a user may interact with device 705 via I/O controller 745 or via hardware components controlled by I/O controller 745.

Figure 8:
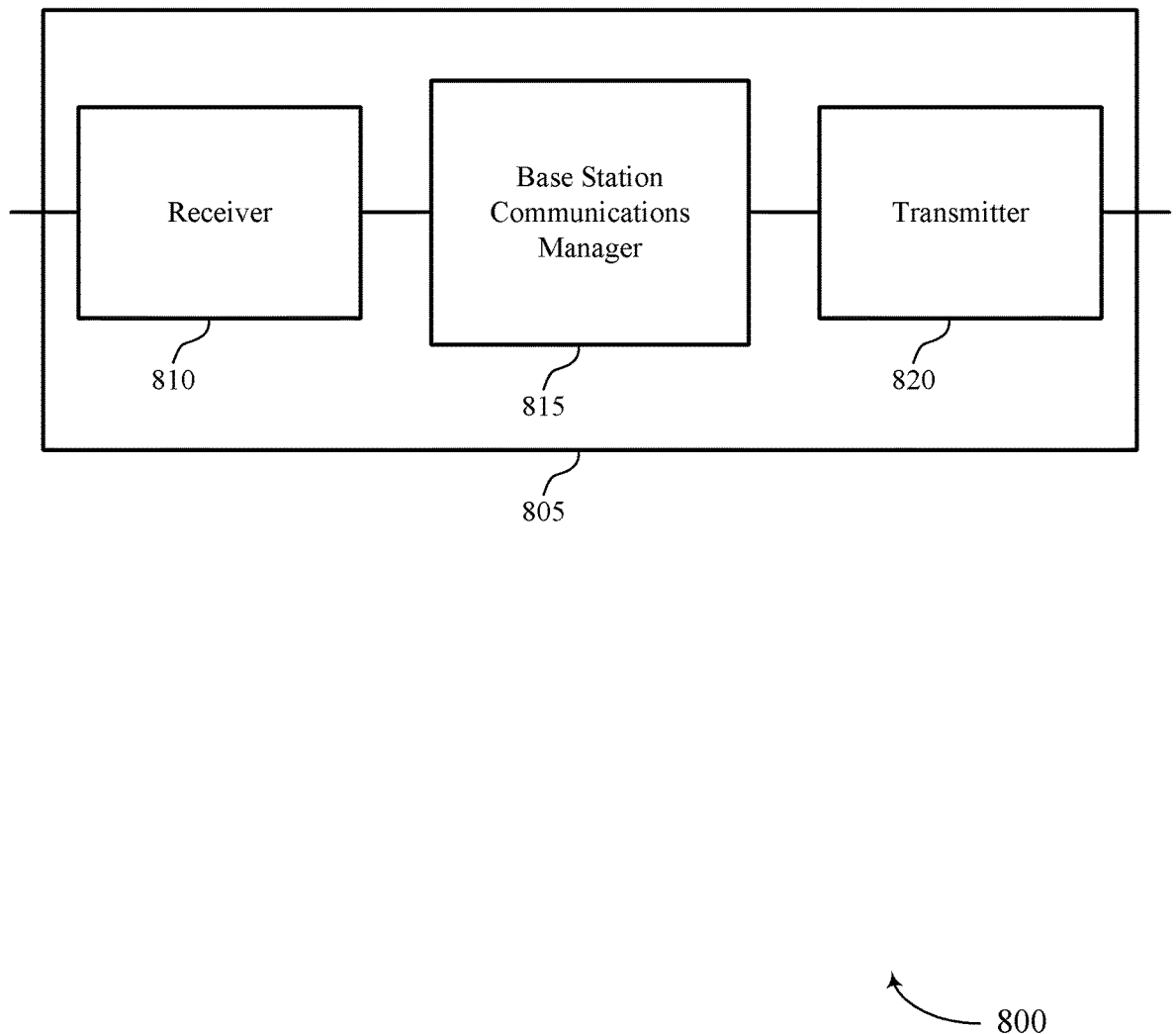
FIGS. 8 and 9 show block diagrams of a device that supports collision avoidance for transmissions in coinciding TTIs in accordance with aspects of the present disclosure.

FIG. 8 shows a block diagram 800 of a wireless device 805 that supports collision avoidance for transmissions in coinciding TTIs in accordance with aspects of the present disclosure. Wireless device 805 may be an example of aspects of a base station 105 as described herein. Wireless device 805 may include a receiver 810, a base station communications manager 815, and a transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to collision avoidance for transmissions in coinciding TTIs, etc.). Information may be passed on to other components of wireless device 805. Receiver 810 may be an example of aspects of a transceiver 1035 described with reference to FIG. 10. Receiver 810 may utilize a single antenna or a set of antennas.

Base station communications manager 815 may be an example of aspects of a base station communications manager 1015 described with reference to FIG. 10. Base station communications manager 815 and/or at least some of its various sub-components may be implemented in hardware, software executed by a processor, firmware, or any combination thereof. If implemented in software executed by a processor, the functions of base station communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

Base station communications manager 815 and/or at least some of its various sub-components may be physically located at various positions, including being distributed such that portions of functions are implemented at different physical locations by one or more physical devices. In some examples, base station communications manager 815 and/or at least some of its various sub-components may be a separate and distinct component in accordance with various aspects of the present disclosure. In other examples, base station communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 815 may identify that a UE is configured to transmit a first message during each of a set of first TTIs of a repetition window, each of the first TTIs having a first priority, identify that the UE is configured to transmit one or more second messages during one or more second TTIs each having a second priority that is higher than the first priority, and schedule transmissions of the first message and the one or more second messages based on identifying that the UE is configured to transmit the first message during each of the set of first TTIs of the repetition window.

Transmitter 820 may transmit signals generated by other components of wireless device 805. In some examples, transmitter 820 may be collocated with a receiver 810 in a transceiver module. For example, transmitter 820 may be an example of aspects of the transceiver 1035 described with reference to FIG. 10. The transmitter 820 may utilize a single antenna or a set of antennas.

Figure 9:
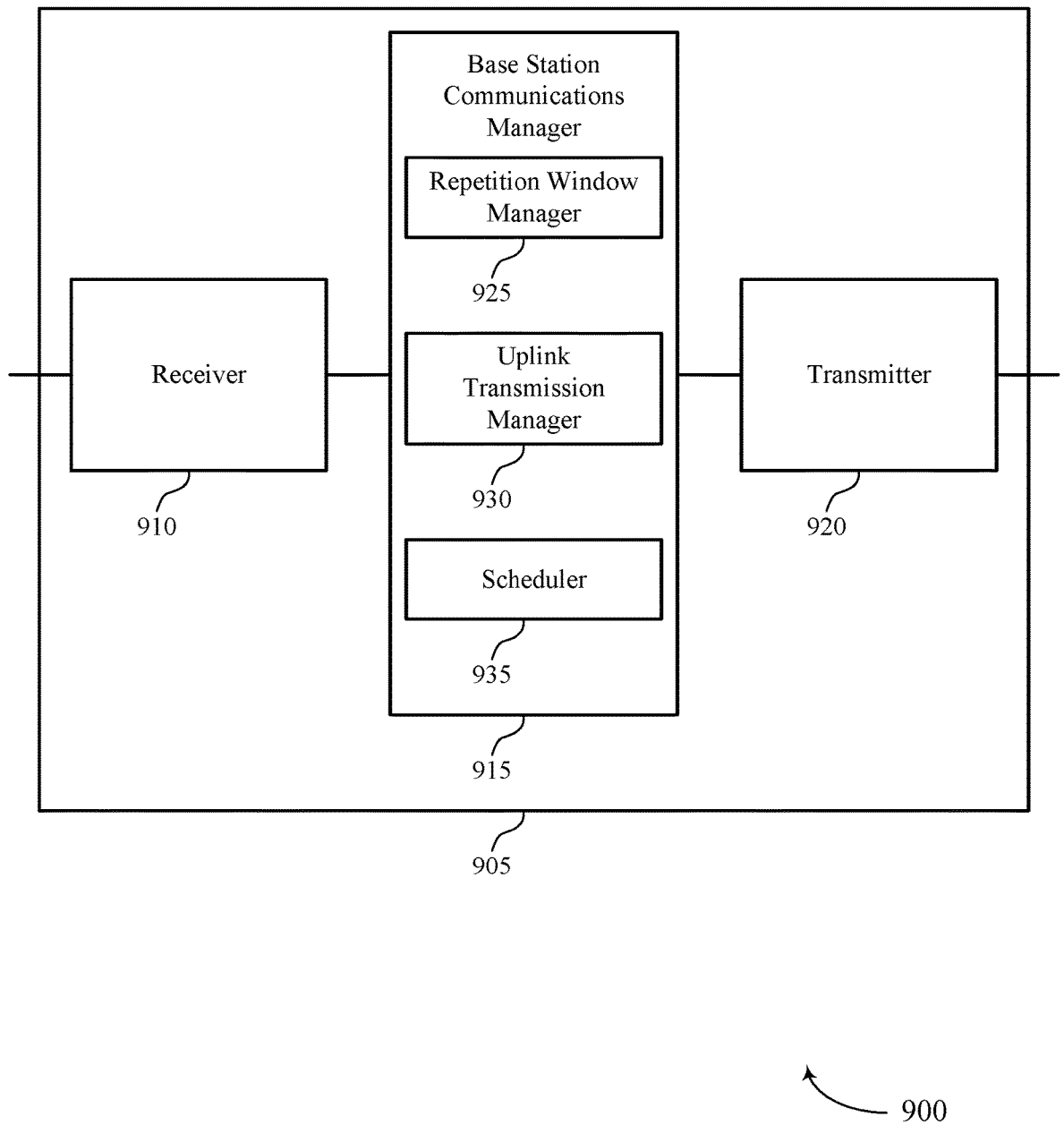

FIG. 9 shows a block diagram 900 of a wireless device 905 that supports collision avoidance for transmissions in coinciding TTIs in accordance with aspects of the present disclosure. Wireless device 905 may be an example of aspects of a wireless device 805 or a base station 105 as described with reference to FIGS. 1, 2, and 8. Wireless device 905 may include a receiver 910, a base station communications manager 915, and a transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to collision avoidance for transmissions in coinciding TTIs, etc.). Information may be passed on to other components of wireless device 905. Receiver 910 may be an example of aspects of the transceiver 1035 described with reference to FIG. 10. Receiver 910 may utilize a single antenna or a set of antennas.

Base station communications manager 915 may be an example of aspects of a base station communications manager 1015 described with reference to FIG. 10. Base station communications manager 915 may include a repetition window manager 925, an uplink transmission manager 930, and a scheduler 935.

Repetition window manager 925 may identify that a UE is configured to transmit a first message during each of a set of first TTIs of a repetition window, each of the first TTIs having a first priority. Uplink transmission manager 930 may identify that the UE is configured to transmit one or more second messages during one or more second TTIs each having a second priority that is higher than the first priority. Scheduler 935 may schedule transmissions of the first message and the one or more second messages based on identifying that the UE is configured to transmit the first message during each of the set of first TTIs of the repetition window. In some cases, scheduling transmissions of the first message and the one or more second messages includes scheduling transmissions of the first message and the one or more second messages such that the one or more second messages are not transmitted during second TTIs that coincide with the first TTIs of the repetition window.

Transmitter 920 may transmit signals generated by other components of wireless device 905. In some examples, transmitter 920 may be collocated with a receiver 910 in a transceiver module. For example, transmitter 920 may be an example of aspects of the transceiver 1035 described with reference to FIG. 10. Transmitter 920 may utilize a single antenna or a set of antennas.

Figure 10:
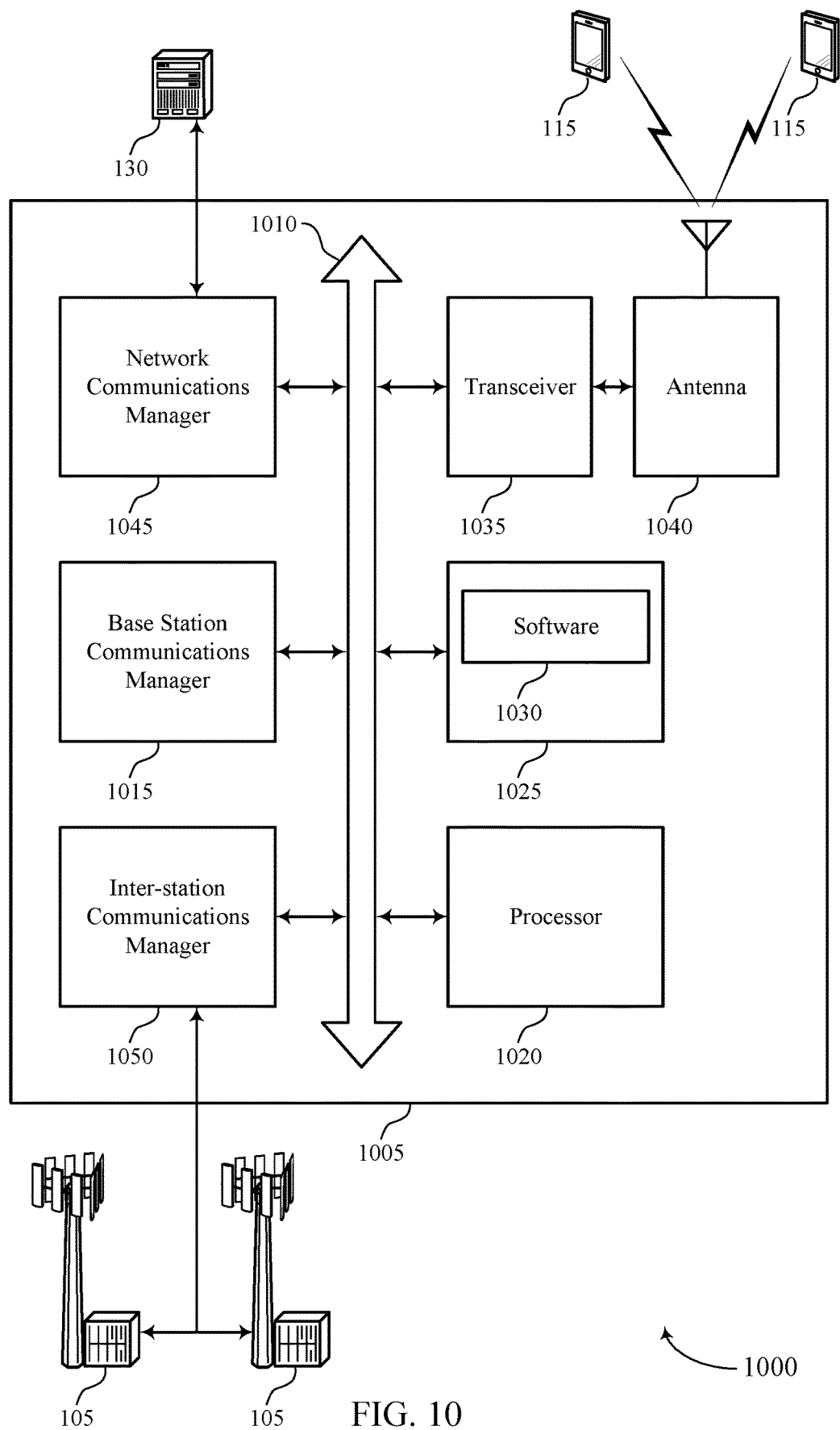
FIG. 10 illustrates a block diagram of a system including a base station that supports collision avoidance for transmissions in coinciding TTIs in accordance with aspects of the present disclosure.

FIG. 10 shows a diagram of a system 1000 including a device 1005 that supports collision avoidance for transmissions in coinciding TTIs in accordance with aspects of the present disclosure. Device 1005 may be an example of or include the components of base station 105 as described above, e.g., with reference to FIG. 1. Device 1005 may include components for bi-directional voice and data communications including components for transmitting and receiving communications, including a base station communications manager 1015, a processor 1020, memory 1025, software 1030, a transceiver 1035, an antenna 1040, a network communications manager 1045, and an inter-station communications manager 1050. These components may be in electronic communication via one or more buses (e.g., bus 1010). Device 1005 may communicate wirelessly with one or more UEs 115.

Processor 1020 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting collision avoidance for transmissions in coinciding TTIs).

Memory 1025 may include RAM and ROM. The memory 1025 may store computer-readable, computer-executable software 1030 including instructions that, when executed, cause the processor to perform various functions described herein. In some cases, the memory 1025 may contain, among other things, a BIOS which may control basic hardware or software operation such as the interaction with peripheral components or devices.

Software 1030 may include code to implement aspects of the present disclosure, including code to support collision avoidance for transmissions in coinciding TTIs. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, transceiver 1035 may represent a wireless transceiver and may communicate bi-directionally with another wireless transceiver. Transceiver 1035 may also include a modem to modulate the packets and provide the modulated packets to the antennas for transmission, and to demodulate packets received from the antennas.

In some cases, device 1005 may include a single antenna 1040. However, in some cases, device 1005 may have more than one antenna 1040, which may be capable of concurrently transmitting or receiving multiple wireless transmissions.

Network communications manager 1045 may manage communications with the core network (e.g., via one or more wired backhaul links). For example, the network communications manager 1045 may manage the transfer of data communications for client devices, such as one or more UEs 115.

Inter-station communications manager 1050 may manage communications with other base station 105 and may include a controller or scheduler for controlling communications with UEs 115 in cooperation with other base stations 105. For example, inter-station communications manager 1050 may coordinate scheduling for transmissions to UEs 115 for various interference mitigation techniques such as beamforming or joint transmission. In some examples, inter-station communications manager 1050 may provide an X2 interface within an LTE/LTE-A wireless communication network technology to provide communication between base stations 105.

Figure 11:
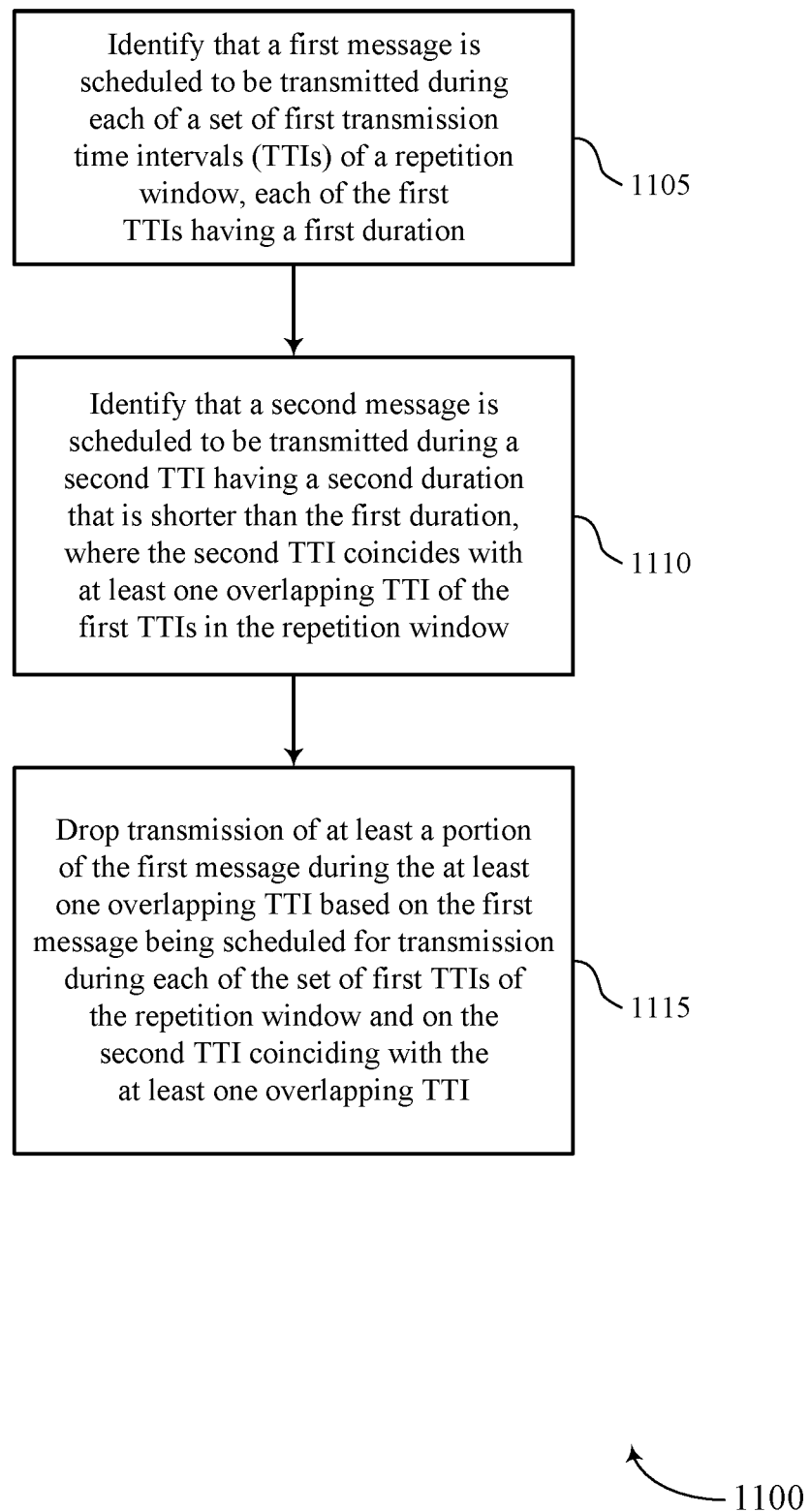
FIGS. 11 and 12 illustrate methods for collision avoidance for transmissions in coinciding TTIs in accordance with aspects of the present disclosure.

FIG. 11 shows a flowchart illustrating a method 1100 for collision avoidance for transmissions in coinciding TTIs in accordance with aspects of the present disclosure. The operations of method 1100 may be implemented by a UE 115 or its components as described herein. For example, the operations of method 1100 may be performed by a UE communications manager as described with reference to FIGS. 5-7. In some examples, a UE 115 may execute a set of codes to control the functional elements of the device to perform the functions described below. Additionally or alternatively, UE 115 may perform aspects of the functions described below using special-purpose hardware.

At 1105, UE 115 may identify that a first message is scheduled to be transmitted during each of a plurality of first TTIs of a repetition window, each of the first TTIs having a first priority. The operations of 1105 may be performed according to the methods described herein. In certain examples, aspects of the operations of 1105 may be performed by a repetition window manager as described with reference to FIGS. 5-7.

At 1110, UE 115 may identify that a second message is scheduled to be transmitted during a second TTI having a second priority that is higher than the first priority, wherein the second TTI coincides with at least one overlapping TTI of the first TTIs in the repetition window. The operations of 1110 may be performed according to the methods described herein. In certain examples, aspects of the operations of 1110 may be performed by a repetition window manager as described with reference to FIGS. 5-7.

At 1115, UE 115 may drop transmission of at least a portion of the first message during the at least one overlapping TTI based at least in part on the first message being scheduled for transmission during each of the plurality of first TTIs of the repetition window and on the second TTI coinciding with the at least one overlapping TTI. The operations of 1115 may be performed according to the methods described herein. In certain examples, aspects of the operations of 1115 may be performed by a transmission dropping component as described with reference to FIGS. 5-7.

Figure 12:
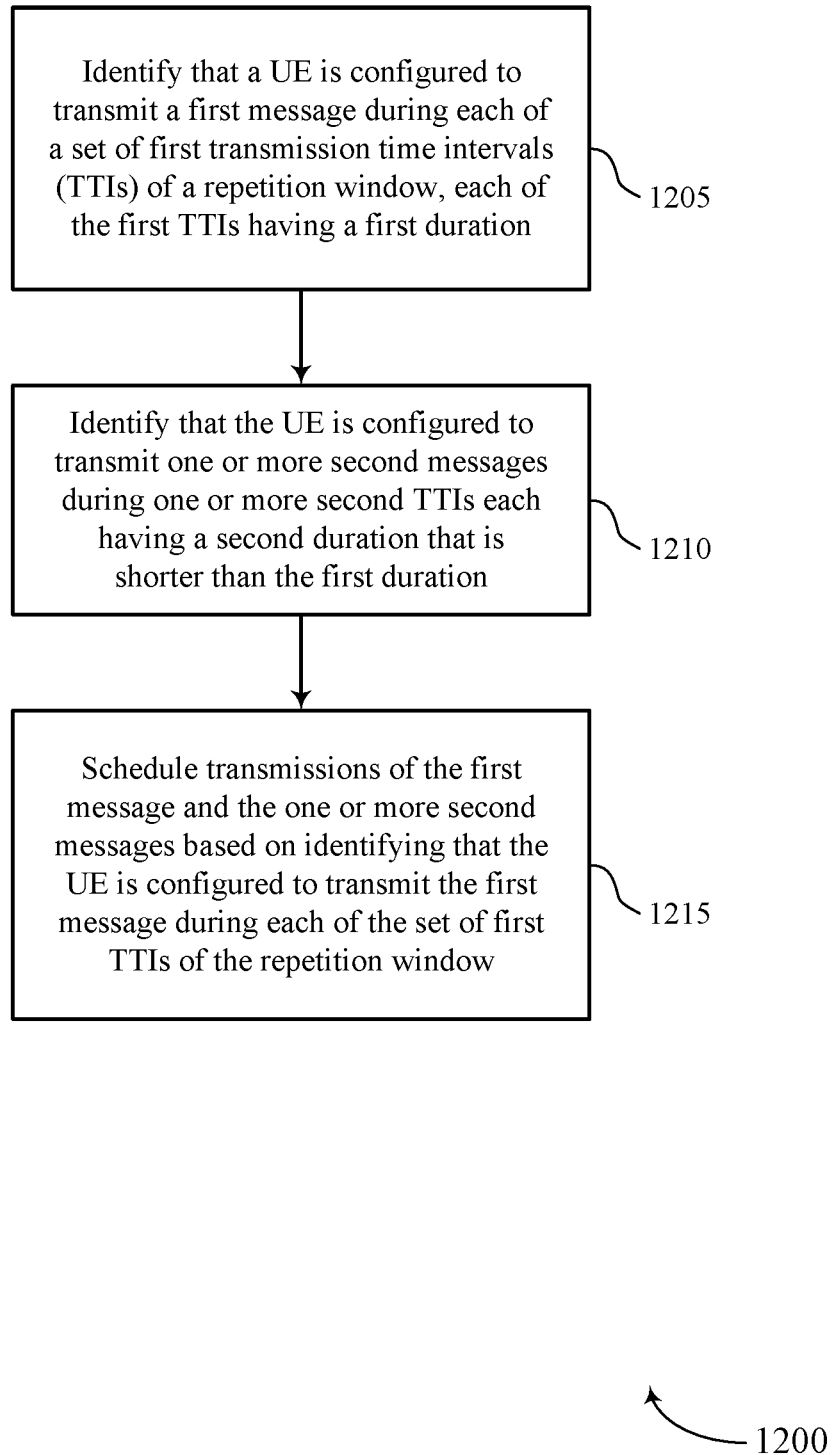

FIG. 12 shows a flowchart illustrating a method 1200 for collision avoidance for transmissions in coinciding TTIs in accordance with aspects of the present disclosure. The operations of method 1200 may be implemented by a base station 105 or its components as described herein. For example, the operations of method 1200 may be performed by a base station communications manager as described with reference to FIGS. 8-10. In some examples, a base station 105 may execute a set of codes to control the functional elements of the device to perform the functions described below. Additionally or alternatively, base station 105 may perform aspects of the functions described below using special-purpose hardware.

At 1205, base station 105 may identify that a UE is configured to transmit a first message during each of a plurality of first TTIs of a repetition window, each of the first TTIs having a first priority. The operations of 1205 may be performed according to the methods described herein. In certain examples, aspects of the operations of 1205 may be performed by a repetition window manager as described with reference to FIGS. 8-10.

At 1210, base station 105 may identify that the UE is configured to transmit one or more second messages during one or more second TTIs each having a second priority that is higher than the first priority. The operations of 1210 may be performed according to the methods described herein. In certain examples, aspects of the operations of 1210 may be performed by an uplink transmission manager as described with reference to FIGS. 8-10.

At 1215, base station 105 may schedule transmissions of the first message and the one or more second messages based at least in part on identifying that the UE is configured to transmit the first message during each of the plurality of first TTIs of the repetition window. The operations of 1215 may be performed according to the methods described herein. In certain examples, aspects of the operations of 1215 may be performed by a scheduler as described with reference to FIGS. 8-10.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    identifying that a first message is scheduled to be transmitted during each of a plurality of first transmission time intervals (TTIs) of a repetition window, each of the first TTIs comprising a respective repetition of the first message and having a first priority, wherein the repetition window includes the plurality of the first TTIs and is a time frame for repeated transmissions of the first message;
    identifying that a second message is scheduled to be transmitted during a second TTI having a second priority that is higher than the first priority, wherein the second TTI coincides with at least one overlapping TTI of the first TTIs in the repetition window; and
    dropping transmission of at least a portion of the first message during the at least one overlapping TTI based at least in part on the first message being scheduled for transmission during each of the plurality of first TTIs of the repetition window and on the second TTI coinciding with the at least one overlapping TTI.

2. The method of claim 1, wherein each of the plurality of TTIs has a first duration and the second TTI has a second duration, wherein the second duration is shorter than the first duration.

3. The method of claim 1, further comprising:
    transmitting the second message during the second TTI without inclusion of any portion of the first message.

4. The method of claim 1, further comprising:
transmitting the second message during the second TTI; and
transmitting the at least the portion of the first message during the second TTI.

5. The method of claim 4, wherein the at least the portion of the first message transmitted in the second TTI comprises hybrid automatic repeat request (HARQ) bits.

6. The method of claim 1, further comprising:
dropping respective repetitions of the first message during subsequent TTIs in the repetition window based at least in part on the second TTI coinciding with the at least one overlapping TTI, the subsequent TTIs following the at least one overlapping TTI in the repetition window.

7. The method of claim 6, further comprising:
identifying that a third message is scheduled to be transmitted during each of a plurality of third TTIs of another repetition window following the first TTIs of the repetition window, each of the third TTIs comprising a respective repetition of the third message and having the first duration; and
transmitting the third message during the subsequent TTIs in the repetition window based at least in part on the transmissions of the first message being dropped during each of the subsequent TTIs.

8. The method of claim 1, further comprising:
transmitting a respective repetition of the first message during each subsequent TTI in the repetition window, the subsequent TTIs following the at least one overlapping TTI in the repetition window.

9. The method of claim 1, further comprising:
determining whether to transmit a respective repetition of the first message during each subsequent TTI in the repetition window based at least in part on a length of the repetition window, the subsequent TTIs following the at least one overlapping TTI in the repetition window.

10. The method of claim 9, further comprising:
determining that the length of the repetition window is above a threshold; and
transmitting a respective repetition of the first message during each subsequent TTI in the repetition window based at least in part on the determination.

11. The method of claim 9, further comprising:
determining that the length of the repetition window is below a threshold; and
dropping respective repetitions of the first message during each subsequent TTI in the repetition window based at least in part on the determination.

12. The method of claim 1, further comprising:
determining whether to transmit a respective repetition of the first message during each subsequent TTI in the repetition window based at least in part on a number of the at least one overlapping TTI, the subsequent TTIs following the at least one overlapping TTI in the repetition window.

13. The method of claim 12, further comprising:
determining that the number of the at least one overlapping TTI is below a threshold; and
transmitting a respective repetition of the first message during each subsequent TTI in the repetition window based at least in part on the determination.

14. The method of claim 12, further comprising:
determining that the number of the at least one overlapping TTI is above a threshold; and
dropping respective repetitions of the first message during each subsequent TTI in the repetition window based at least in part on the determination.

15. The method of claim 1, further comprising:
identifying a length of the repetition window;
identifying a number of the at least one overlapping TTI; and
determining whether to drop a respective repetition of the first message during each subsequent TTI in the repetition window based at least in part on the identified length of the repetition window and the identified number of the at least one overlapping TTI, the subsequent TTIs following the at least one overlapping TTI in the repetition window.

16. The method of claim 1, wherein identifying that the second message is scheduled to be transmitted during the second TTI having the second duration comprises:
identifying that the second message is scheduled to be transmitted during each of a plurality of second TTIs of another repetition window, wherein at least some of the second TTIs coincide with the at least one overlapping TTI of the first TTIs.

17. The method of claim 16, further comprising:
transmitting the second message during each of the second TTIs without inclusion of any portion of the first message.

18. The method of claim 16, further comprising:
transmitting the second message during each of the second TTIs; and
transmitting the at least the portion of the first message during each of the second TTIs.

19. The method of claim 18, wherein the at least the portion of the first message transmitted during each of the second TTIs comprises hybrid automatic repeat request (HARQ) bits.

20. The method of claim 16, further comprising:
transmitting the second message during each of the second TTIs; and
transmitting the at least the portion of the first message during an initial TTI of the second TTIs.

21. The method of claim 20, wherein the at least the portion of the first message transmitted in the initial TTI of the second TTIs comprises hybrid automatic repeat request (HARQ) bits.

22. The method of claim 1, wherein the repetition window is associated with hybrid automatic repeat request (HARQ) repetition or physical uplink shared channel (PUSCH) repetition.

23. The method of claim 1, wherein the first message is scheduled to be transmitted by a first user equipment (UE) and the second message is scheduled to be transmitted by a second UE.

24. The method of claim 23, wherein dropping transmission of the at least the portion of the first message comprises:
dropping transmission of the at least the portion of the first message that coincides with the second TTI.

25. The method of claim 1, further comprising:
determining at least one of the first priority or the second priority based at least in part on a DCI or a scheduling timing of one of the first message or the second message.

26. A method for wireless communication, comprising:
identifying that a user equipment (UE) is configured to transmit a first message during each of a plurality of first transmission time intervals (TTIs) of a repetition window, each of the first TTIs comprising a respective repetition of the first message and having a first priority, wherein the repetition window includes the plurality of TTIs and is a time frame for repeated transmissions of the first message;

identifying that the UE is configured to transmit one or more second messages during one or more second TTIs each having a second priority that is higher than the first priority; and scheduling transmissions of the first message and the one or more second messages based at least in part on identifying that the UE is configured to transmit the first message during each of the plurality of first TTIs of the repetition window.

27. The method of claim 26, wherein each of the plurality of TTIs has a first duration and the second TTI has a second duration, wherein the second duration is shorter than the first duration.

28. The method of claim 26, wherein scheduling transmissions of the first message and the one or more second messages comprises:

scheduling transmissions of the first message and the one or more second messages such that the one or more second messages are not transmitted during second TTIs that coincide with the first TTIs of the repetition window.

29. An apparatus for wireless communication, comprising:

a processor;

memory coupled with the processor; and instructions stored in the memory and executable by the processor to cause the apparatus to:

identify that a first message is scheduled to be transmitted during each of a plurality of first transmission time intervals (TTIs) of a repetition window, each of the first TTIs comprising a respective repetition of the first message and having a first priority, wherein the repetition window includes the plurality of the first TTIs and is a time frame for repeated transmissions of the first message;

identify that a second message is scheduled to be transmitted during a second TTI having a second priority that is higher than the first priority, wherein the second TTI coincides with at least one overlapping TTI of the first TTIs in the repetition window; and drop transmission of at least a portion of the first message during the at least one overlapping TTI based at least in part on the first message being scheduled for transmission during each of the plurality of first TTIs of the repetition window and on the second TTI coinciding with the at least one overlapping TTI.

30. An apparatus for wireless communication, comprising:

a processor;

memory coupled with the processor; and instructions stored in the memory and executable by the processor to cause the apparatus to:

identify that a user equipment (UE) is configured to transmit a first message during each of a plurality of first transmission time intervals (TTIs) of a repetition window, each of the first TTIs comprising a respective repetition of the first message and having a first priority, wherein the repetition window includes the plurality of the first TTIs and is a time frame for repeated transmissions of the first message;

identify that the UE is configured to transmit one or more second messages during one or more second TTIs each having a second priority that is higher than the first priority; and schedule transmissions of the first message and the one or more second messages based at least in part on identifying that the UE is configured to transmit the first message during each of the plurality of first TTIs of the repetition window.

* * * * *